United States Patent
Hoffstein et al.

(10) Patent No.: US 10,924,287 B2
(45) Date of Patent: Feb. 16, 2021

(54) DIGITAL SIGNATURE TECHNIQUE

(71) Applicant: Onboard Security, Inc., San Diego, CA (US)

(72) Inventors: Jeffrey Hoffstein, Providence, RI (US); Jill Pipher, Providence, RI (US); William J Whyte, Belmont, MA (US); Zhenfei Zhang, Burlington, MA (US)

(73) Assignee: OnBoard Security, Inc., San Diego, CA (US)

(*) Notice: Subject to any disclaimer, the term of this patent is extended or adjusted under 35 U.S.C. 154(b) by 200 days.

(21) Appl. No.: 15/998,072

(22) Filed: Jun. 22, 2018

(65) Prior Publication Data

US 2019/0020486 A1   Jan. 17, 2019

Related U.S. Application Data

(60) Provisional application No. 62/604,121, filed on Jun. 23, 2017.

(51) Int. Cl.
*H04L 9/32* (2006.01)
*H04L 9/30* (2006.01)
*G06F 7/58* (2006.01)

(52) U.S. Cl.
CPC ......... *H04L 9/3247* (2013.01); *H04L 9/3026* (2013.01); *H04L 9/3093* (2013.01); *H04L 9/3242* (2013.01); *G06F 7/588* (2013.01)

(58) Field of Classification Search
CPC ... H04L 9/3247; H04L 9/3093; H04L 9/3026; H04L 9/3242; G06F 7/588

(Continued)

(56) References Cited

U.S. PATENT DOCUMENTS 5,347,581 A * 9/1994 Naccache ............. H04L 9/3252
380/28
6,076,163 A * 6/2000 Hoffstein ............. H04L 9/3271
380/28

(Continued)

OTHER PUBLICATIONS

"Learning a Parallelepiped: Cryptanalysis of GGH and NTRU Signatures", P.Q. Nguyen and O. Regev, Advances in Cryptography—Eurocrypt 2006, Lecture Notes, in Computer Science, vol. 4004, Springer, Berlin (2006).

(Continued)

*Primary Examiner* — David J Pearson
*Assistant Examiner* — Badri Champakesan
(74) *Attorney, Agent, or Firm* — Polsinelli LLP

(57) ABSTRACT

A method is set forth for signing and subsequently verifying a plurality of digital messages, including the following steps implemented using at least one processor-based subsystem: selecting parameters including an integer q, a relatively smaller integer p that is coprime with q, and a Gaussian function parameter; generating random polynomial f relating to p and random polynomial g relating to q; producing a public key that includes h, where h is equal to a product that can be derived using g and the inverse of f mod q; producing a private key from which f and g can be derived; storing the private key and publishing the public key; producing a plurality of message digests by hashing each of the digital messages with the public key; for each message digest, producing a digital signature using the message digest, the private key, and a Gaussian noise polynomial related to the Gaussian function parameter; and performing a batch verification procedure utilizing the plurality of digital signatures and the public key to determine whether the digital signatures are valid.

13 Claims, 5 Drawing Sheets

(58) Field of Classification Search
USPC .......................................................... 713/176
See application file for complete search history.

(56) References Cited

U.S. PATENT DOCUMENTS

| | | | | |
|---|---|---|---|---|
| 6,081,597 | A * | 6/2000 | Hoffstein | H04L 9/3093 380/28 |
| 6,298,137 | B1 * | 10/2001 | Hoffstein | H04L 9/3093 380/28 |
| 6,959,085 | B1 * | 10/2005 | Hoffstein | H04L 9/008 380/2 |
| 7,308,097 | B2 * | 12/2007 | Hoffstein | H04L 9/3247 380/277 |
| 7,890,763 | B1 * | 2/2011 | Law | H04L 9/3073 713/176 |
| 7,913,088 | B2 * | 3/2011 | Hoffstein | H04L 9/3093 713/180 |
| 8,688,977 | B2 * | 4/2014 | Zaverucha | H04L 9/3263 713/156 |
| 9,634,840 | B2 * | 4/2017 | Hoffstein | H04L 9/3026 |
| 9,722,798 | B2 * | 8/2017 | Hoffstein | H04L 9/3236 |
| 2007/0028114 | A1 * | 2/2007 | McCullagh | H04L 9/3247 713/176 |
| 2008/0226066 | A1 * | 9/2008 | Yi | H04L 9/3247 380/47 |
| 2008/0320557 | A1 * | 12/2008 | Hakuta | H04L 9/3252 726/2 |
| 2009/0112956 | A1 * | 4/2009 | Cheon | G06F 7/724 708/207 |
| 2012/0159179 | A1 * | 6/2012 | Lauter | H04L 9/3247 713/179 |
| 2015/0033025 | A1 * | 1/2015 | Hoffstein | H04L 9/3093 713/176 |
| 2015/0229478 | A1 * | 8/2015 | Hoffstein | H04L 9/3093 713/176 |
| 2015/0281256 | A1 * | 10/2015 | Hwang | H04L 9/3073 726/30 |
| 2017/0250819 | A1 * | 8/2017 | Hoffstein | H04L 9/3026 |

OTHER PUBLICATIONS

"NTRUSign: Digital Signatures Using the NTRU Lattice", J. Hoffstein, N. Howgrave Graham, J. Pipher, J. Silverman, and W. Whyte, Topics in Cryptology—CT-RSA 2003, Lecture Notes in Computer Science, vol. 2612, Springer, Berlin (2003).

Hoffstein, J., Lieman, D., Silverman, J.H.: Polynomial Rings and Efficient Public Key Authentication II. In: Lam, K.Y., Shparlikski, I., Wang, H., Xing, C. (eds.), Cryptography and Computational Number Theory, Progress in Computer Science and Applied Logic, vol. 20, pp. 269-286, Birkhauser (2001).

Lyubashevsky, V., Fiat-Shamir With Aborts, Applications to Lattice and Factoring-Based Signatures, in: ASIACRYPT 2009, pp. 598-616. Springer (2009).

Gentry, C., Peikert, C., Vaikuntanathan, V.: How to Use a Short Basis: Trapdoors for Hard Lattices and New Cryptographic Constructions. In: Proceedings of the 40th Annual ACM Symposium on Theory of Computing. pp. 197-206. STPC 2008, ACM (2008).

Lyubashevsky, V.: Lattice-Based Identification Schemes Secure Under Active Attacks. In. Cramer, R. (ed.) PKC 2008, LNCS, vol. 4939, pp. 162-179. Springer (2008).

Lyubashevsky, V., Micciancio, D.: Generalized Compact Knapsacks Are Collision Resistant. In: Bugliesi, M., Preneel, B., Sassone, V., Wegener, I. (eds.) Automata, Languages and Programming, LNCS, vol. 4052, pp. 144-155. Springer (2006).

Güneysu, T., Lyubashevsky, V., Pöppelmann, T.: Practical Lattice Based Cryptography: A Signature Scheme for Embedded Systems. In: Prouff, E., Schaumont, P. (eds.) CHES 2012, LNCS, vol. 7428, pp. 530-547. Springer (2012).

Ducas, L., Dumus, A., Lepoint, T., Lyubashevsky, V.: Lattice Signatures and Bimodal Gaussians. In: Canetti, R., Garay, J.A. (eds.) CRYPTO 2013, LNCS, vol. 8042, pp. 40-56. Springer (2013).

E. Barker, NSA Suite B Crptography—NSA/CSS, 16 pages, 2006.

Martin R. Albrecht, Shi Bai, and Leo Ducas. A Subfield Lattice Attack on Overstretched NTRU Assumptions—Cryptanalysis of Some FHE and Graded Encoding Schemes, in CRYPTO 2016, 2016.

Erdem Alkim, Nina Bindel, Johannes A. Buchmann, and Ozgur Dagdelen, TESLA: Tightly-Secure Efficient Signatures From Standard Lattices, IACR Cryptology ePrint Archive, 2015:755, 2015.

Erdem Alkim, Leo Ducas, Thomas Poppelmann, and Peter Schwabe, Postquantum Key Exchange—A New Hope, in 25th USENIX Security Symposium, USENIX Security 16, Austin, TX, USA, Aug. 10-12, 2016., pp. 327-343, 2016.

Joel Alwen, Stephan Krenn, Krzysztof Pietrzak, and Daniel Wichs, Learning With Rounding, Revisited—New Reduction, Properties and Applications, in CRYPTO 2013, pp. 57-74, 2013.

Shi Bai, Thijs Laarhoven, and Damien Stehle, Tuple Lattice Sieving, IACR Cryptology ePrint Archive, 2016:713, 2016.

Abhishek Banerjee, Chris Peikert, and Alon Rosen, Pseudorandom Functions and Lattices, in EUROCRYPT 2012, 2012.

Daniel J. Bernstein, A Subfield-Logarithm Attack Against Ideal Lattices, 2014. Available from https://blog.cr.yp.to/20140213-ideal.html.

Lily Chen, Stephen Jordan, Yi-Kai Liu, Dustin Moody, Rene Peralta, Ray Perlner, and Daniel Smith-Tone, Report on Post-Quantum Cryptography, National Institute of Standards and Technology Internal Report 8105, Feb. 2016.

Yuanmi Chen and Phong Q Nguyen. BKZ 2.0: Better Lattice Security Estimates, in ASIACRYPT 2011, pp. 1-20. Springer, 2011.

Don Coppersmith and Adi Shamir, Lattice Attacks on NTRU, in EUROCRYPT, pp. 52-61, 1997.

Jintai Ding et al., A Simple Provably Secure Key Exchange Scheme Based on the Learning With Errors Problem, IACR Cryptology ePrint Archive, 2012:688, 2012.

Leo Ducas, Eike Kiltz, Tancrede Lepoint, Vadim Lyubashevsky, Peter Schwabe, Gregor Seiler, and Damien Stehle, Crystals—Dilithium: Digital Signatures From Module Lattices, IACR Cryptology ePrint Archive, 2017:633, 2017.

Leo Ducas, Vadim Lyubashevsky, and Thomas Prest, Efficient Identity-Based Encryption Over NTRU Lattices, in ASIACRYPT 2014, 2014.

Leo Ducas and Phong Q. Nguyen, Learning a Zonotope and More: Cryptanalysis of Ntrusign Countermeasures, in ASIACRYPT 2012, pp. 433-450, 2012.

Pierre-Alain Fouque, Jeffrey Hoffstein, Paul Kirchner, Vadim Lyubashevsky, Thomas Pornin, Thomas Prest, Thomas Ricosset, Gregor Seiler, William Whyte, and Zhenfei Zhang, Falcon: Fast-Fourier Lattice-Based Compact Signatures Over NTRU, 2017.

Nicolas Gama et al., Predicting Lattice Reduction, in EUROCRYPT'08, 2008.

Nicolas Gama, Phong Q. Nguyen, and Oded Regev, Lattice Enumeration Using Extreme Pruning, in EUROCRYPT 2010, vol. 6110 of LNCS, pp. 257-278. Springer, 2010.

Oded Goldreich, Shafi Goldwasser, and Shai Halevi, Public-Key Cryptosystems From Lattice Reduction Problems, in CRYPTO '97, pp. 112-131, 1997.

Lov K. Grover. A Fast Quantum Mechanical Algorithm for Database Search, in Proceedings of the Twenty-Eighth Annual ACM Symposium on Theory of Computing, STOC '96, New York, NY, USA, 1996.

Jeffrey Hoffstein, Jill Pipher, John M. Schanck, Joseph H. Silverman, and William Whyte, Transcript Secure Signatures Based on Modular Lattices, in PQCrypto 2014, pp. 142-159, 2014.

Jeffrey Hoffstein, Jill Pipher, and William Whyte, More Efficient Parameters, Keys, and Encoding for Hybrid-Resistant NTRUencrypt and and NTRUSign, pp. 3-18, 2017.

Jeffrey Hoffstein, Jill Pipher, and Joseph H. Silverman, NTRU: A Ring-Based Public Key Cryptosystem, in Algorithmic Number Theory, Third International Symposium, ANTS-III, Portland, Oregon, USA, Jun. 21-25, 1998, Proceedings, pp. 267-288, 1998.

Jeffrey Hoffstein, Jill Pipher, William Whyte, and Zhenfei Zhang, A Signature Scheme From Learning With Truncation, Cryptology ePrint Archive, Report 2017/995, 2017. http://eprint.iacr.org/2017/995.

(56) References Cited

OTHER PUBLICATIONS

Jeffrey Hoffstein and Joseph H. Silverman, Meet-In-The-Middle Attack on an NTRU Private Key, 2006, available from http://www.ntru.com.
Nick Howgrave-Graham, CRYPTO 2007, Chapter A Hybrid Lattice-Reduction and Meet-In-The-Middle Attack Against NTRU, pp. 150{169, Springer Berlin Heidelberg, Berlin, Heidelberg, 2007.
Vadim Lyubashevsky, Lattice Signatures Without Trapdoors, in David Pointcheval and Thomas Johansson, editors, EUROCRYPT 2012, vol. 7237 of LNCS, pp. 738-755. Springer, 2012.
Vadim Lyubashevsky and Daniele Micciancio, on Bounded Distance Decoding, Unique Shortest Vectors, and the Minimum Distance Problem, in CRYPTO 2009, pp. 577-594, 2009.
Daniele Micciancio and Chris Peikert, Hardness of SIS and LWE With Small Parameters, in CRYPTO 2013, pp. 21-39, 2013.
Daniele Micciancio and Oded Regev, Worst-Case to Average-Case Reductions Based on Gaussian Measures, SIAM J. Comput., 37(1):267-302, 2007.
Chris Peikert, Lattice Cryptography for the Internet, in PQCrypto 2014, 2014.
Oded Regev, on lattices, Learning With Errors, Random Linear Codes, and Cryptography, in Proceedings of the 37th Annual ACM Symposium on Theory of Computing, Baltimore, MD, USA, May 22-24, 2005, pp. 84-93, 2005.
Peter W. Shor, Algorithms for Quantum Computation: Discrete Logarithms and Factoring, in FOCS, pp. 124-134, 1994.
Jiang Zhang, Zhenfeng Zhang, Jintai Ding, and Michael Snook, Authenticated Key Exchange From Ideal Lattices, IACR Cryptology ePrint Archive, 2014:589, 2014.

\* cited by examiner

US 10,924,287 B2

DIGITAL SIGNATURE TECHNIQUE

RELATED APPLICATION

This application claims priority from U.S. Provisional Patent Application No. 62/604,121 filed Jun. 23, 2017, and said Provisional Patent Application is incorporated herein by reference.

FIELD OF THE INVENTION

This invention relates to the field of cryptography and, more particularly, to a public key digital signature technique.

BACKGROUND OF THE INVENTION

Public key digital signatures are important for secure exchange of information between plural parties, for example between computers or mobile devices, or between a smart card and a terminal.

An example of an earlier digital signature and authentication method and apparatus is described in U.S. Pat. No. 7,308,097, assigned to the same assignee as the present Application, and sometimes referred to as "NTRUSign" (mark of NTRU Cryptosystems, Inc.). Reference can also be made to "NTRUSign: Digital Signatures Using the NTRU Lattice", J. Hoffstein, N. Howgrave Graham, J. Pipher, J. Silverman, and W. Whyte, Topics In Cryptology-CT-RSA 2003, Lecture Notes in Computer Science, Vol. 2612, Springer, Berlin, 2003.

The signing technique in the '097 Patent uses a mixing system based on multiplication in a ring and reduction modulo an ideal q in that ring; while the verification technique uses special properties of products of elements whose validity depends on elementary probability theory. The security of the identification/digital signature scheme comes from the interaction of reduction modulo q and the difficulty of forming products with special properties. In an embodiment of the digital signature scheme of the '097 Patent, the security also relies on the experimentally observed fact that for most lattices, it is very difficult to find a vector whose length is only a little bit longer than the shortest vector, and it is also difficult to find a lattice vector that is quite close to a randomly chosen nonlattice vector.

A more recent public key digital signature technique is described in U.S. Pat. No. 9,722,798, assigned to the same Assignee as the present Application, incorporated by reference, and sometimes referred to as "pqNTRUSign" (mark of NTRU Cryptosystems, Inc.). Reference can also be made to Jeffrey Hoffstein, Jill Pipher, John M. Schanck, Joseph H. Silverman, and William Whyte, "Transcript Secure Signatures Based on Modular Lattices", In PQCrypto 2014, pages 142-159, 2014, also incorporated by reference. In the technique of the '798 Patent and the related publication, through the use of two coprime integers, it is possible to create signatures using only a short half-basis. The previous summarized "NTRUSign" technique of U.S. Pat. No. 7,308,097 was based directly on a close vector problem. In other words, given a point in lattice space, the signer demonstrates that they can find a point in the lattice near to it. This requires the signer to know a full basis for the lattice, so during key generation "NTRUSign" had to generate a complete basis. It did this by starting with a half-basis (f, g) and completing the basis by finding (F, G). In contrast, in the pqNTRUSign technique, after key generation the signer demonstrates a different ability: that given a point in the vector space, they can find a lattice point with a particular property. (This lattice point is the signature; in this case, the property is that the signature is equal to the message representative when taken mod p). Signing doesn't require the signer to know a full basis. The signer just needs to know enough short lattice vectors to find a vector that has the desired property. Thus, an advantage of the "pqNTRUSign" technique of the '798 Patent, is that this can be done with only a half-basis. This allows key generation to stop after generating half the basis, without requiring the computationally intensive step of completing the basis. It also makes signing more efficient as only the relatively smaller half-basis need be used.

The appended Appendix I includes, initially, a review of the "pqNTRUSign" signature technique, its characteristics and aspects of its security. Although the "pqNTRUSign" technique has proved advantageous in the art, it is among the objects hereof to achieve further improvements in digital signature and related techniques.

SUMMARY OF THE INVENTION

Early lattice-based signature schemes, such as the previously described "NTRUSign" technique, leaks private key information in a transcript of message/signature pairs. An attacker can produce a signing key from a long enough transcript using methods such as "learning a parallelepiped" (see Phong Q. Nguyen and Oded Regev, "Learning A Parallelepiped": Cryptanalysis of GGH and NTRU signatures. J. Cryptology, 22(2):139-160, 2009; Chris Peikert, "Lattice Cryptography for The Internet," in PQCrypto 2014, pages 197-219, 2014). Lyubashevsky had proposed a rejection sampling method to thwart transcript leakage attacks. Using his technique, signatures are produced according to a fixed public distribution (typically either a Gaussian or a uniform distribution). A transcript reveals only this public distribution and contains no information about the particular signing key that is used to generate the signatures. Reference can be made to Appendix 1 for further details. The sampling method therefore becomes a core issue in designing signature schemes. For example, replacing a Gaussian sampler with a bimodal Gaussian sampler (see Leo Ducas, Alain Durmus, Tancrede Lepoint, and Vadim Lyubashevsky, "Lattice Signatures And Bimodal Gaussians," in CRYPTO 2013, pages 40-56, 2013) significantly improves the performance of a scheme.

As described in Jeffrey Hoffstein, Jill Pipher, John M. Schanck, Joseph H. Silverman, and William Whyte, "Transcript Secure Signatures Based On Modular Lattices," in PQCrypto 2014, pages 142-159, 2014, a signature in the modular lattice scheme is a lattice vector. Since the verifier already knows a (bad) basis of the lattice for verification purpose, it is sufficient to transmit part of the vector v as long as the verifier can complete the whole vector during the verification phase.

Popular lattice-based schemes, (such as Leo Ducas, Alain Durmus, Tancrede Lepoint, and Vadim Lyubashevsky, "Lattice Signatures And Bimodal Gaussians," in CRYPTO 2013, pages 40-56, 2013; Erdem Alkim, Nina Bindel, Johannes A. Buchmann, and Ozgur Dagdelen, "TESLA: Tightly-Secure Efficient Signatures From Standard Lattices," IACR Cryptology ePrint Archive, 2015:755, 2015) do not have this property. Signatures in those schemes are vectors close to the lattice. Hence, when the vectors are compressed, an additional helper needs to be generated for the verifier to derive the original vector (although this helper is only a few hundred bits).

This advantage in design did not give a smaller signature size for the above-referenced modular lattice scheme of Hoffstein et al, 2014, supra, due to the sampling method. For an n-dimensional vector with coefficients in $$\left[-\frac{q}{2}, \frac{q}{2}\right),$$

it requires n[log q] bits for storage. For comparison, a discrete Gaussian vector of the same dimension with a deviation of σ~√q can be stored with $$\sim n\left(\frac{\log q}{2} + 2\right)$$

bits. Regarding the question of whether one can use (bimodal) Gaussian sampling for modular lattice signatures, as seen in Appendix 1, a positive answer can be given. As also seen in Appendix 1, with pqNTRUSign, Gaussian sampling enables obtainment of an advantageous feature; namely, signature aggregation.

Signature aggregation, also known as batch verification, allows one to verify a set of signatures, signed under a same key, with operations that are on the order of a single verification. Generic batch verification means the verifier is able to verify signatures signed under different public keys. A weaker notion of same key batch verification, on the other hand, assumes all signatures are signed under a same key. It is still a very useful property. As an example, for a secure boot mechanism where the software image is signed, signature aggregation allows one to sign individual software images individually (and do so component wise rather than monolithic updates) while still verifying the entire set of software images in one pass. This allows for faster boot.

The technique hereof allows for same key batch verification (with fine-tuned parameters). Generally speaking, a signature v for a message digest m is valid so long as v≡mod p and v∈$\mathcal{L}$. Therefore, for a set of signatures $\{v_i\}$, corresponding to a set of messages $\{m_i\}$, we have $$\Sigma v_i \equiv \Sigma m_i \bmod p; \qquad 1.$$

$$\Sigma v_i \in \mathcal{L} \qquad 2.$$

As such, one can simply check $\Sigma v_i$ instead of checking each individual v. When realizing this technique for the scheme hereof, a single ring multiplication (which is usually the most costly operation in verification) can be used to verify a batch of signatures. Nevertheless, it is noted that one will still need to perform multiple hash functions to obtain the message digests. In addition, since the accumulated signature is a larger vector in the lattice (compared to a single signature), it will be required that the corresponding lattice problem for this accumulated signature is also hard.

In accordance with a form of the invention, a method is set forth for signing and subsequently verifying a plurality of digital messages, comprising the following steps implemented using at least one processor-based subsystem: selecting parameters including an integer q, a relatively smaller integer p that is coprime with q, and a Gaussian function parameter; generating random polynomial f relating to p and random polynomial g relating to q; producing a public key that includes h, where h is equal to a product that can be derived using g and the inverse of f mod q; producing a private key from which f and g can be derived; storing the private key and publishing the public key; producing a plurality of message digests by hashing each of the digital messages with the public key; for each message digest, producing a digital signature using the message digest, the private key, and a Gaussian noise polynomial related to said Gaussian function parameter; and performing a batch verification procedure utilizing the plurality of digital signatures and the public key to determine whether the digital signatures are valid.

In an embodiment of this form of the invention, the step of performing a batch verification procedure includes implementing a verification on a modulo p summation of a component of all of said digital signatures. In this embodiment, said step of producing a digital signature further includes implementing an iterative rejection sampling procedure comprising employing successive randomly generated Gaussian noise polynomials, in conjunction with a message digest and the private key, to obtain candidate digital signatures until a particular candidate digital signature is obtained that meets predetermined criteria, and selecting said particular candidate digital signature. Also in a form of this embodiment, the method further comprises transmitting the digital signatures, and said step of performing a verification procedure includes receiving the transmitted digital signatures and performing the batch verification procedure on the received digital signatures. In all cases, the plurality of digital messages can comprise a multiplicity of digital messages.

In accordance with a further form of the invention, a method is set forth for signing and subsequently verifying a digital message, comprising the following steps implemented using at least one processor-based subsystem: selecting parameters including an integer q, a relatively smaller integer p that is coprime with q, and a Gaussian function parameter; generating random polynomial f relating to p and random polynomial g relating to q; producing a public key that includes h, where h is equal to a product that can be derived using g and the inverse of f mod q; producing a private key from which f and g can be derived; storing the private key and publishing the public key; producing a message digest by hashing the digital message with the public key; producing a digital signature using the message digest, the private key, and Gaussian noise polynomials related to said Gaussian function parameter, including implementing an iterative rejection sampling procedure comprising employing successive randomly generated Gaussian noise polynomials, in conjunction with the message digest and the private key, to obtain candidate digital signatures until a particular candidate digital signature is obtained that meets predetermined criteria, and selecting said particular candidate digital signature; and performing a verification procedure utilizing the digital signature and the public key to determine whether the digital signature is valid.

Further features and advantages of the invention will become more readily apparent from the following detailed description when taken in conjunction with the accompanying drawings.

DETAILED DESCRIPTION

Figure 1:
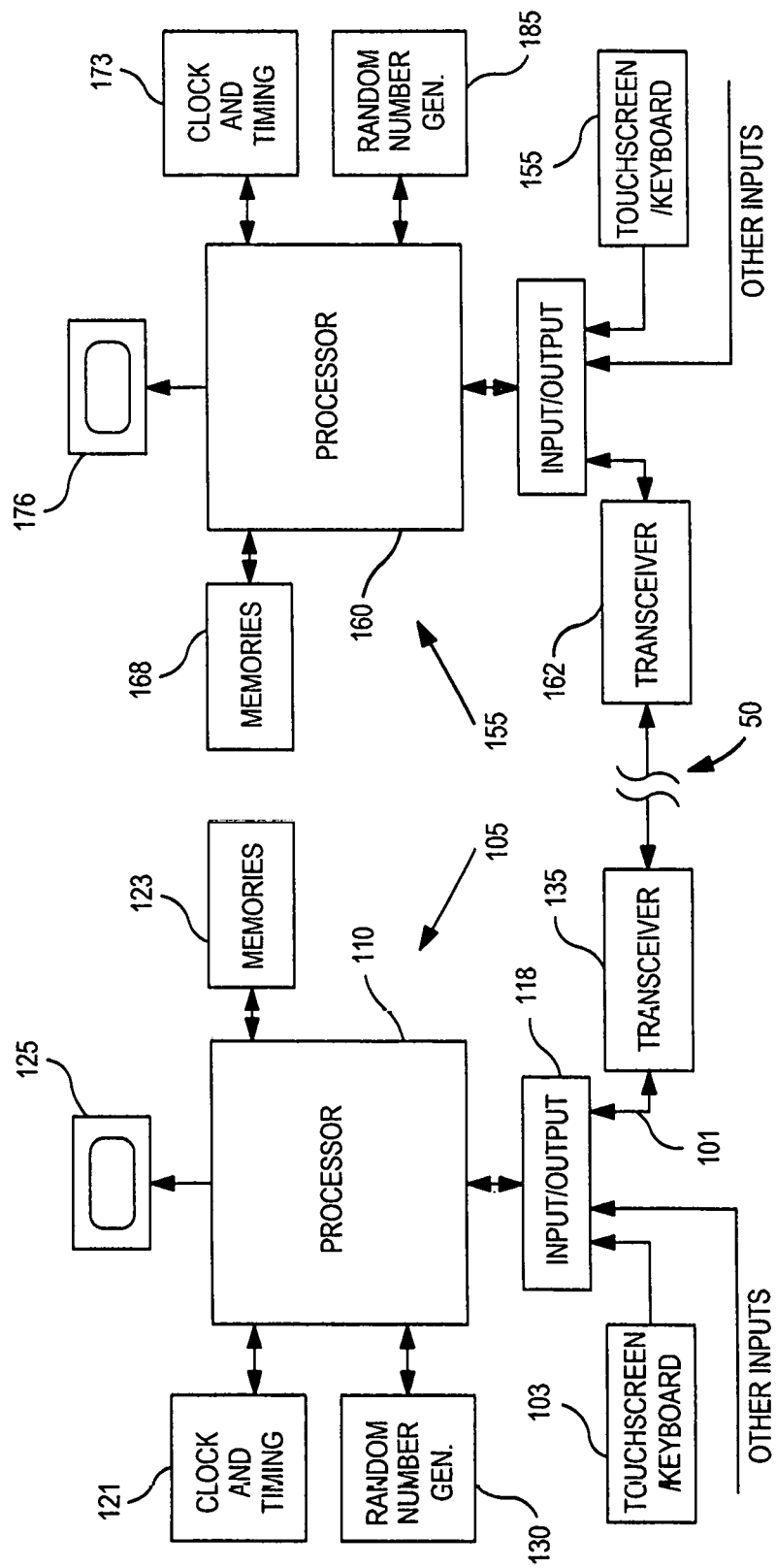
FIG. 1 is a block diagram of a system that can be used in practicing embodiments of the invention.

FIG. 1 is a block diagram of a system that can be used in practicing embodiments of the invention. Two processor-based subsystems 105 and 155 are shown as being in communication over an insecure channel 50, which may be, for example, any wired or wireless communication channel such as a telephone or internet communication channel. The subsystem 105 includes processor 110 and the subsystem 155 includes processor 160. The subsystems can typically comprise mobile devices, computers, or terminals. When programmed in the manner to be described, the processors 110 and 160 and their associated circuits can be used to implement an embodiment of the invention and to practice an embodiment of the method of the invention. The processors 110 and 160 may each be any suitable processor, for example an electronic digital processor or microprocessor. It will be understood that any general purpose or special purpose processor, or other machine or circuitry that can perform the functions described herein, electronically, optically, or by other means, can be utilized. The subsystem 105 will typically include memories 123, clock and timing circuitry 121, input/output functions 118 and display 125, which may all be of conventional types. Inputs can include a touchscreen/keyboard input as represented at 103. Communication is via transceiver 135, which may comprise a modem or any suitable device for communicating signals.

The subsystem 155 in this illustrative embodiment can have a similar configuration to that of subsystem 105. The processor 160 has associated input/output circuitry 164, memories 168, clock and timing circuitry 173, and a display 176. Inputs include a touchscreen/keyboard 155. Communication of subsystem 155 with the outside world is via transceiver 162 which, again, may comprise a modem or any suitable device for communicating signals.

Figure 2:
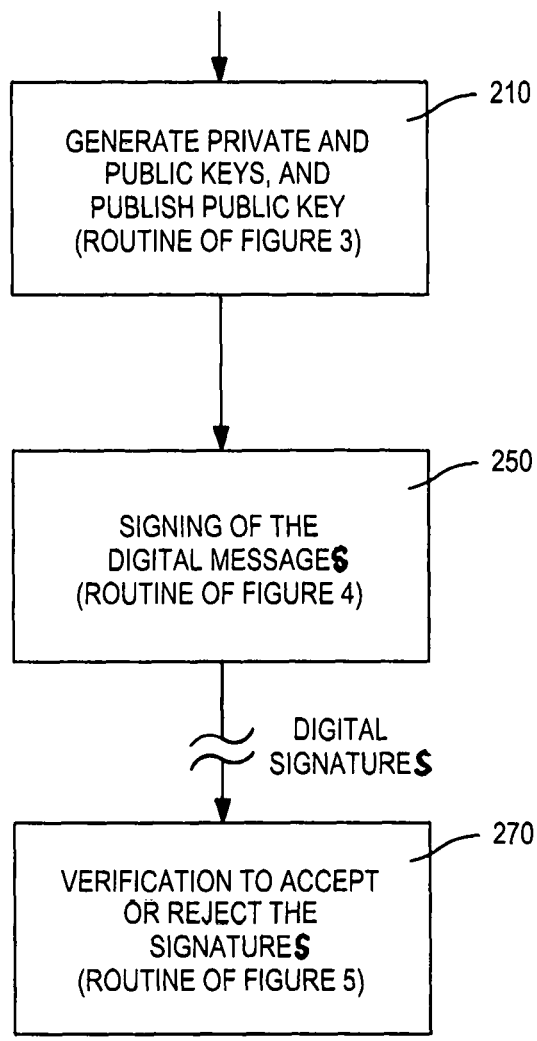
FIG. 2 is a flow diagram of a public key digital signature technique which, when taken with the subsidiary flow diagrams referred to therein, can be used in implementing embodiments of the invention.

FIG. 2 illustrates a basic procedure that can be utilized with a public key digital signature technique, and refers to routines illustrated by other referenced flow diagrams which describe features in accordance with an embodiment of the invention. Reference can also be made to Appendix I for further details of the invention. The block 210 represents the generating of the public key and private key signals and data, and the publishing of the public key. The routine of an embodiment thereof is described in conjunction with the flow diagram of FIG. 3. In the present example, this operation can be performed, for example, at the processor-based subsystem 105 of FIG. 1. The public key information can be published; that is, made available to any member of the public or to any desired group to whom the private key holder desires to send the digital signatures. Typically, although not necessarily, the public key may be made available at a central public key library facility or website where a directory of public key holders and their public keys are maintained.

Figure 4:
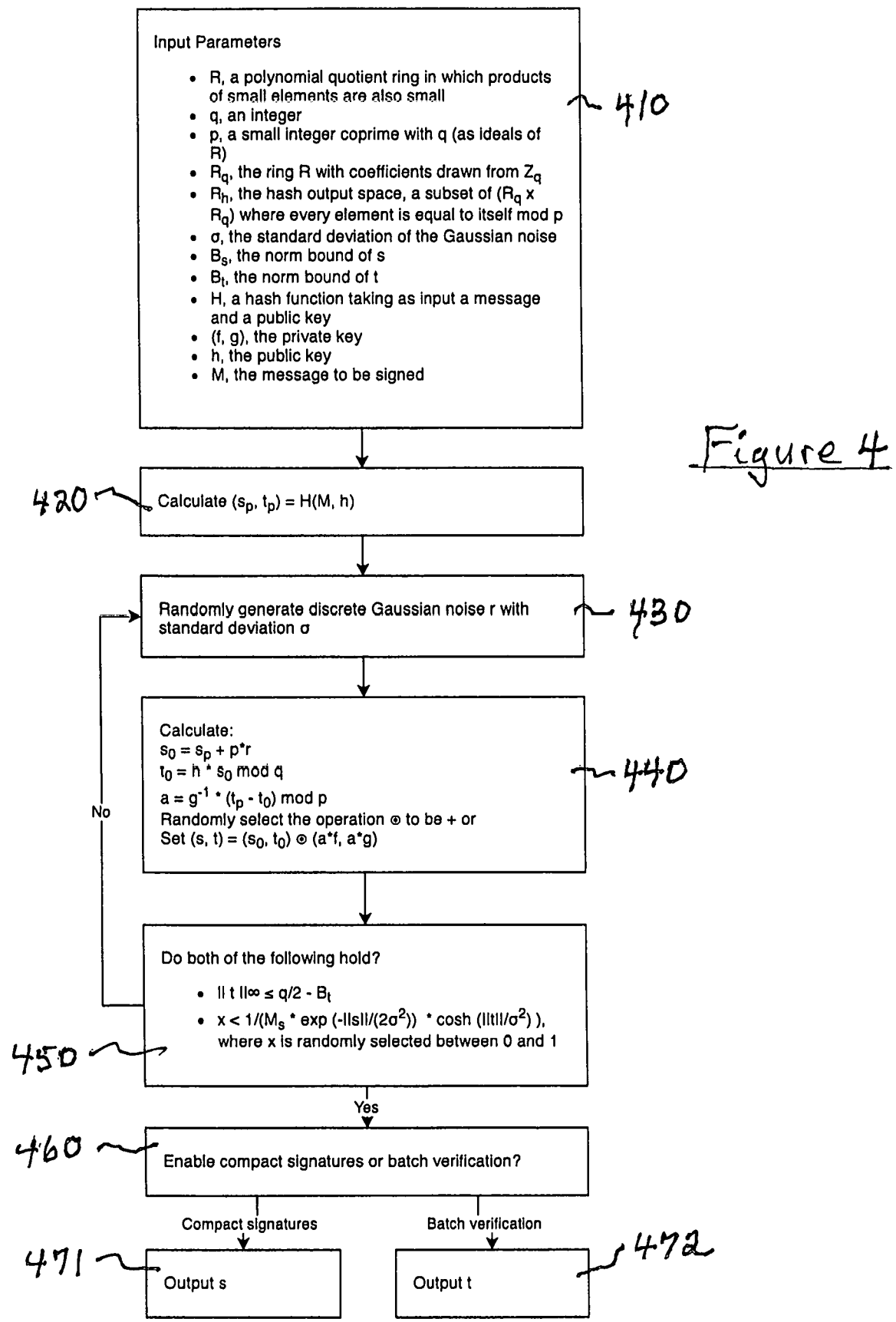
FIG. 4 is a flow diagram, in accordance with an embodiment hereof, of a routine for signing digital messages.

The block 250 represents a routine that can be employed (that is, in this example, by the user of processor-based subsystem 155 of FIG. 1) for signing a plurality of digital messages. [In some situations, there will be "a multiplicity of" (many) digital messages to be signed.] This routine, in accordance with an embodiment of the invention, is described in conjunction with the flow diagram of FIG. 4. In this example, the digital signatures and messages can then transmitted over the channel 50 (FIG. 1).

The block 270 represents a routine that can be employed (that is, in this example, by the user of processor-based subsystem 155 of FIG. 1) for using, inter alia, the public key to implement a batch verification procedure to either accept or reject the plurality of digital signatures. This routine, in accordance with an embodiment of the invention, is described in conjunction with the flow diagram of FIG. 5.

Figure 3:
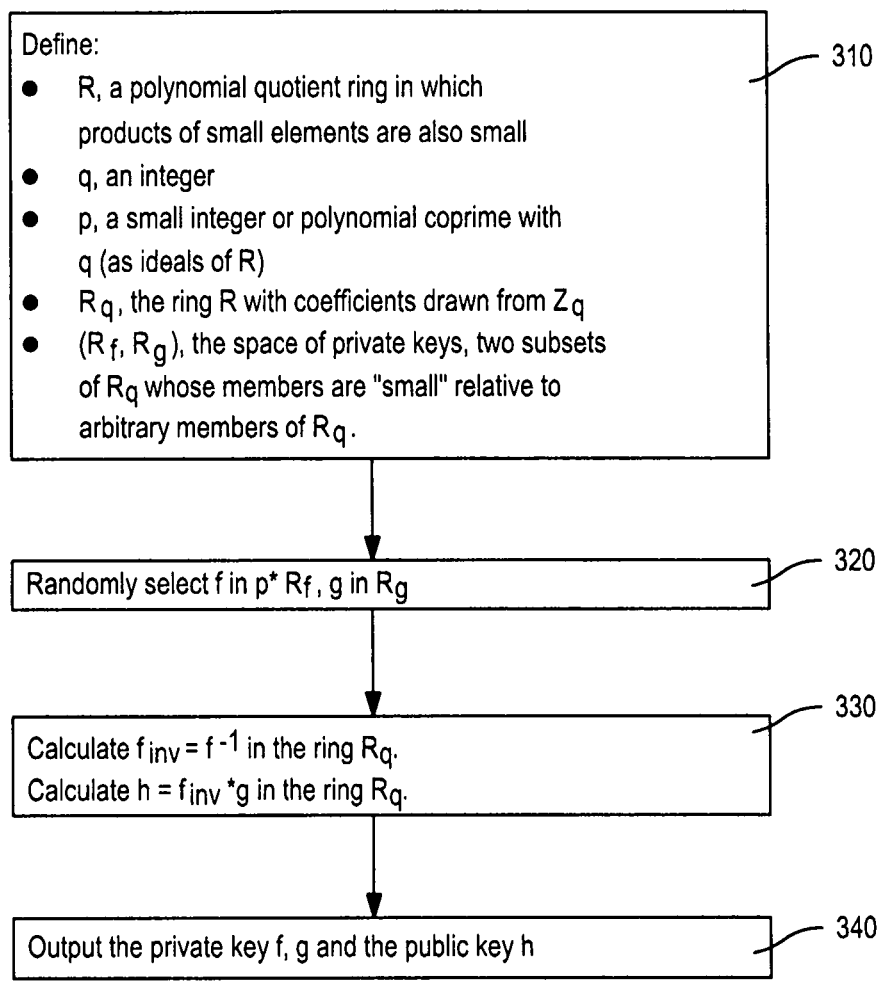
FIG. 3 is a flow diagram, in accordance with an embodiment hereof, of a routine for key generation.

FIG. 3 is a flow diagram of a routine, represented by the block 210 of FIG. 2, in accordance with an embodiment of the invention, for implementing key generation. Reference can also be made to Appendix I. The block 310 represents the defining and/or inputting of parameters used in key generation, which include: R, a polyhnomial quotient ring in which products of small elements are also small; q, an integer; p, a small integer or polynomial coprime with q (as ideals of R); Rq, the ring with coefficients drawn from Zq (where Zq is the integers taken mod q); and ($R_f$, $R_g$), the space of private keys, two subsets of the ring Rq whose members are "small" relative to arbitrary members of Rq. The block 320 represents the step of randomly selecting f in $p*R_f$ and g in $R_g$. [As described in Appendix I, the random polynomials can be chosen such that f is p times a trinary polynomial and such that $\|g\| \le p/2$. Writing f=pF, so F is trinary, it is assumed that F is invertible modulo q and modulo p. If not, this f can be discarded and a new one chosen.] Then, as represented by the block 330, the inverse of f (that is, $f^{-1}$) in the ring Rq, called $f_{inv}$, is computed, and h is computed as $h=f_{inv}*g$ in the ring q. The private key f, g and the public key h can then be output, as represented by the block 340.

FIG. 4 is a flow diagram of a routine, represented by the block 240 of FIG. 2, in accordance with an embodiment of the invention, for implementing the signing of the digital messages using, inter alia, the public key and the private key. Reference can also be made to Appendix I.

Referring to FIG. 4, the block 410 represents the inputting of the following: R, a polynomial quotient ring in which products of small elements are also small; q, an integer; p, a small integer coprime with q (as ideals of R); $R_q$, the ring R with coefficients drawn from $Z_q$; $R_h$, the hash output space, a subset of ($R_q \times R_q$) where every element is equal to itself mod p; a, the standard deviation of Gaussian noise; $B_s$, the norm bound of s; $B_t$, the norm bound of t; H, a hash function taking as input a message and a public key; (f, g), the private key; h, the public key; and M, the message to be signed. (M corresponds to p in Appendix I).

As represented by the block 420, a document hash, mod p, designated ($s_p$, $t_p$), is calculated as H(M, h); that is the hash of the message and the public key. The hash (message digest) can be visualized as having vector components s and t, taken modulo p; that is ($s_p$, $t_p$).

Next, the loop of blocks 430, 440, and 450 implements the rejection sampling of candidate signatures, and selection of a candidate signature that meets predetermined criteria (see, also, Appendix I). The block 430 represents randomly generating Gaussian noise r with standard deviation a. The block 440 represents the following calculations:

$$s_0 = s_p + p*r$$

$$t_U = h*s_U \bmod q$$

$$a = g^{-1}*(t_p - t_0) \bmod p$$

$$(s,t) = (s_0, t_0) \oplus (a*f, a*g)$$

(where ⊙ is an operation randomly selected to be + or −)

Next, the decision block 450 represents the step of determining whether, for the candidate (s,t), both of the following hold:

$$\|t\|\infty \leq q/2 - B_t$$

$$x < 1/(M_s * \exp(-\|s\|/(2\sigma^2)) * \cos h(\|t\|/(\sigma^2))),$$

(where x is randomly selected between 0 and 1)

If either of these does not hold, the block 430 is re-entered, and the process steps of blocks 430, 440 and 450 are repeated until a candidate digital signature which meets the criteria of block 450 is obtained. The block 460 is then entered, this block representing a determination of enabling compact signatures or batch verification. For compact signatures the vector component (or polynomial) s is output, as represented by block 471. For signatures that can subsequently be batch verified, the vector component (or polynomial) t is output, as represented by block 472. A plurality (or a multiplicity) of messages can be signed in accordance with this routine.

Figure 5:
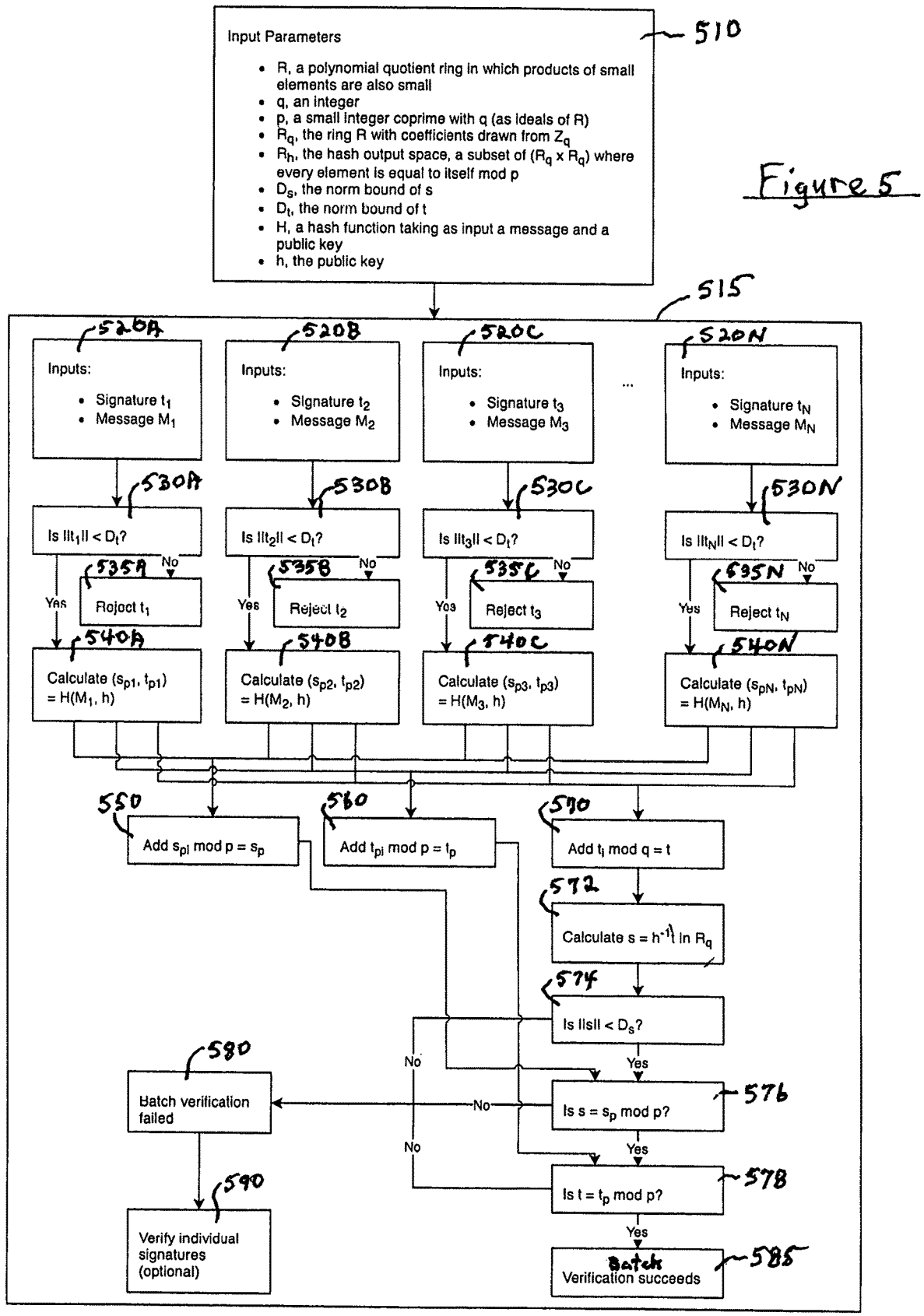
FIG. 5 is a flow diagram, in accordance with an embodiment hereof, of a routine for batch verification of digital signatures.

FIG. 5 is a flow diagram of a routine, represented by the block 270 of FIG. 2, in accordance with an embodiment of the invention, for implementing batch verification of whether a number of received digital signature are valid. Reference can also be made to Appendix I.

The block 510 represents the inputting of the following: R, a polynomial quotient ring in which products of small elements are also small; q, an integer; p, a small integer or polynomial coprime with q (as ideals of R); $R_q$, the ring R with coefficients drawn from $Z_q$; $R_h$, the hash output space, a subset of ($R_q \times R_q$) where every element is equal to itself mod p; $D_s$, the norm bound of the s component of the signature; $D_t$, the norm-bound of the t component of the signature; H, a hash function taking as input a message and a public key; and h, the public key.

The rest of the routine is shown as being within the block 515. The block 520A represents inputting, for a first signature to be verified, signature component $t_1$ and message $M_1$, and blocks 520B, 520C . . . 520N represent the inputting of same for signature components $t_2$, $t_3$, . . . $t_n$ and messages $M_2$, $M_3$ . . . $M_N$. Inquiry is then made (respective decision blocks 530A, 530B, 530C, . . . 530N) as to whether the absolute values of the respective $t_i$'s are less than the norm bound of t. If not, for any of the $t_i$'s, the particular $t_i$'s are rejected (blocks 535A, 535B, 535C, . . . 535N), whereas if so, the blocks 540A, 540B, 540C, . . . 540N are entered, these blocks representing the respective calculations of ($s_{pi}$, $t_{pi}$)=H($M_i$,h) for each message $M_i$. From these calculated values, the sums of $s_{pi}$ taken mod p are used to obtain $s_p$ (block 550), the sums of $t_{pi}$ taken mod p are used to obtain $t_p$ (block 560), and the sums of $t_i$ taken mod q are used to obtain t (block 570). Then, t can be used to obtain s, using $s = h^{-1} t$ in the ring $R_q$, as represented by the block 572. Determinations are then made as to whether the absolute value of s is less than the norm bound of s (block 574), whether s is equal to $s_p$ mod p (block 576, using $s_p$ obtained from block 550), and whether t is equal to $t_p$ mod p (block 578, using $t_p$ obtained from block 560). If all of these determinations are answered in the affirmative, batch verification is deemed to have succeeded (block 585) but, if not, it is deemed to have failed (block 580). In the latter case, individual signatures can optionally be subjected to verification.

The invention has been described with reference to particular preferred embodiments, but variations within the spirit and scope of the invention will occur to those skilled in the art. For example, while a digital signature technique has been described, it will be understood that an authentication producer of the challenge-response-verification type can alternatively be implemented, using the technique hereof and employing the challenge as the message to be signed. Also, it will be understood that coefficients of polynomials can alternatively be represented in other forms including, but not limited to, matrices and/or vectors.

Appendix I

A signature scheme from Learning with Truncation

Abstract. In this paper we revisit the modular lattice signature scheme and its efficient instantiation known as pqNTRUSign. First, we show that a modular lattice signature scheme can be based on a standard lattice problem. As the fundamental problem that needs to be solved by the signer or a potential forger is recovering a lattice vector with a restricted norm, given the least significant bits, we refer to this general class of problems as the "learning with truncation" problem.

We show that by replacing the uniform sampling in pqNTRUSign with a bimodal Gaussian sampling, we can further reduce the size of a signature. As an example, we show that the size of the signature can be as low as 4608 bits for a security level of 128 bits.

An important new contribution, enabled by this Gaussian sampling version of pqNTRUSign, is that we can now perform batch verification of messages signed by the same public key, which allows the verifier to check approximately 100 signatures in a single verification process.

1 Introduction

Organizations and research groups are looking for candidate algorithms to replace RSA and ECC based schemes [12,1] due to the threat of quantum computers [41]. Among all candidates, lattice based solutions seem to offer the most promising solutions. For encryption schemes, NTRUEncrypt [29] is known to be one of the fastest lattice based encryption algorithms to date. In terms of signature schemes, there exist two families of solutions. The first one, initiated from the celebrated rejection sampling methods of [33], was followed by a sequence of improvements and variants [34,16,6,17]. There are the lattice based analogues of Schnorr signatures that use Fiat-Shamir transformation. The other family of novel constructions use the GPV framework [23] that follows a hash-then-sign paradigm. Examples of this construction are [18,20].

In this paper, we revisit the modular lattice signature scheme from [27]. At a high level, it is a hash-then-sign scheme; yet it doesn't rely on the GPV framework. On one hand, it differentiates itself from the above two classes of constructions; on the other hand it combines the hash-then-sign paradigm with rejection techniques. This is one of the reasons we We believe that modular lattice signature schemes are an interesting basis for further invention.

Let us briefly recall the framework of modular lattice signatures. Given a lattice $\mathcal{L}$ with a trapdoor $T$ in the form of a short basis of row vectors; and a message digest in the form of a vector $m$ whose coefficients are in $[0,p)$, the signature of a modular signature scheme in [27] is a lattice vector $v$ such that 1. $v \equiv m \bmod p$; and
2. $v \in \mathcal{L}$.

This vector can be obtained via the following steps:

1. sample a vector $v_0$ from $\mathcal{L}$;
2. use $T$ to micro-adjust the $v_0$ so that $v := v_0 + aT$ meets the congruence condition for some a;
3. use rejection sampling to hide $T$ from $v$ In principle, the above framework works for generic lattices. In practice, it is natural to instantiate the scheme with NTRU lattices [29] as was done in BLISS [16] and DLP [18]. The modular lattice signature scheme instantiated with NTRU lattice is named pqNTRUSign [27].

In this paper we revisit the modular lattice signature scheme and its NTRU instantiation from the following perspectives.

*Security proof.* In the original modular lattice signature scheme in [27], the public key security is connected to a unique shortest non-zero vector problem (uSVP), i.e., recovering $T$ from (a bad basis of) $\mathcal{L}$; while the unforgeability is based on an approximate closest vector problem (approx-CVP) over the intersection of a lattice and a translation of a lattice, namely, $\mathcal{L} \cap (p\mathbb{Z}^n + m_p)$. Although the second problem is conjectured to be hard for this ad hoc lattice, a connection between the first and the second problems is missing. The scheme, therefore, requires two (seemingly independent) hardness assumptions. For example, when the scheme is instantiated via an NTRU lattice [27], they require the uSVP assumption for the NTRU lattice and the above approx-CVP assumption for the intersection of the two lattices.

In this paper, we remove the second assumption. Essentially, the attacker is given a lattice (any lattice, not necessarily an NTRU lattice), and he is asked to find a vector in the lattice such that this vector is congruent to a known value mod $p$. In other words, the attacker needs to find a vector with pre-determined least significant bits. We name this problem the *learning with truncation* (LWT) problem, which can be viewed as the inverse of learning with rounding (LWR) problem, where in this case one is given matrix $A$ and vector $b = \lfloor sA \bmod q \rfloor_p$, and asked to find s. That is, to find a vector related to the lattice where the most significant bits are pre-determined.

This allows us to connect the forgery attack with the approx-SVP. As a result, we only require a single assumption. In particular, when the scheme is instantiated via a Short Integer Solution (SIS) problem, forging a signature in our scheme is as hard as solving an approx-SVP for random lattices. On the other hand, when the scheme is instantiated via an NTRU lattice, we require that approx-SVP is hard for NTRU lattices, which is equivalent to the unique-SVP assumption (up to a polynomial factor, cf. [35]), a.k.a., the NTRU assumption.

*Sampling method.* Early lattice based signature schemes, such as GGHSign [24] and NTRUSign [26], leak private key information in a transcript of message/signature pairs. An attacker can produce a signing key from a long enough transcript using methods for "learning a parallelepiped" [38,19].

In [33], Lyubashevsky proposed a rejection sampling method to thwart transcript leakage attacks. Using his technique, signatures are produced according to a fixed public distribution (typically either a Gaussian as in [33] or a uniform distribution as in [27]). A transcript reveals only this public distribution, and contains no information about the particular signing key that is used to generate the signatures. The sampling method therefore becomes a core issue in designing signature schemes. For example, replacing a Gaussian sampler with a bimodal Gaussian sampler [16] significantly improves the performance of a scheme.

Recall that in [27], a signature in this scheme is a lattice vector. Since the verifier already knows a (bad) basis of the lattice for verification purpose, it is sufficient to transmit part of the vector $v$ as long as the verifier can complete the whole vector during the verification phase.

Popular lattice based schemes, such as BLISS [16] and TESLA [6], do not have this property. Signatures in those schemes are vectors *close* to the lattice. Hence, when the vectors are compressed, an additional helper needs to be generated for the verifier to derive the original vector (although this helper is only a few hundred bits). To be precise, if we parameterize the scheme to be presented in this paper with the same parameters as in [16], the difference in the size of a signature is exactly the size of this helper.

This advantage in design did not give a smaller signature size for [27] due to the sampling method. For an $n$-dimensional vector with coefficients in $[-\frac{q}{2}, \frac{q}{2})$, it requires $n\lceil \log q \rceil$ bits for storage. For comparison, a discrete Gaussian vector of the same dimension with a deviation of $\sigma \sim \sqrt{q}$ can be stored with $\sim n(\frac{\log q}{2} + 2)$ bits. A natural question is whether one can use (bimodal) Gaussian sampling [16] for modular lattice signatures. In this paper, we give a positive answer to this question.

*Remark 1.* Although schemes using Gaussian sampling allow smaller signature sizes, recent development in lattice based signature schemes [17] shows a trend of moving back to uniform rejection sampling since uniform sampling is easier to implement and to ensure constant time. Nevertheless, with pqNTRUSign, Gaussian sampling enables us to obtain an additional property: signature aggregation.

*Signature aggregation.* Signature aggregation, also known as batch verification, allows one to verify a set of signatures, signed under a same key, with operations that are on the order of a single verification. Generic batch verification means the verifier is able to verify signatures signed under different public keys. A weaker notion of *same key batch verification*, on the other hand, assumes all signatures are signed under a same key. It is still a very useful property in many use cases. As an example, for a secure boot mechanism where the software image is signed, signature aggregation allows one to sign individual software images individually (and do so component wise rather than monolithic updates) while still verifying the entire set of software images in one pass. This allows for faster boot.

Our scheme allows for same key batch verification (with fine-tuned parameters). Generally speaking, a signature $v$ for a message digest $m$ is valid so long as $v \equiv m \bmod p$ and $v \in \mathcal{L}$. Therefore, for a set of signatures $\{v_i\}$, corresponding to a set of messages $\{m_i\}$ we have 1. $\sum v_i \equiv \sum m_i \bmod p$; and
2. $\sum v_i \in \mathcal{L}$.

As such, one can simply check $\sum v_i$ instead of checking each individual $v$. When realizing this technique for our proposed scheme, we can use a single ring multiplication (which is usually the most costly operation in verification) to verify a batch of signatures. Nevertheless we note that one will still need to perform multiple hash functions to obtain those message digests. In addition, since the accumulated signature is a larger vector in the lattice (compared to a single signature), we will require that the corresponding lattice problem for this accumulated signature is also hard. We will give more details in section 4.

We also note that schemes that realize the Fiat-Shamir heuristic, such as BLISS [16] and TESLA [6], cannot provide this property easily as they need to perform the ring operations before the hash function.

*Paper Organization.* Due to the page limitation, background to this work are presented in Appendix A. In section 2 we give a modular lattice signature scheme based on the short integer solution problem. We show that to forge a signature is as hard as solving the computational LWR problem for a random lattice. This is followed by a practical instantiation using NTRU lattices and a bimodal Gaussian in section 3. Then we explain signature aggregation in more details in section 4 and present parameters and a security analysis for our practical instantiation in the Appendix B and C.

2 Modular lattice signatures with Gaussian sampling

2.1 The scheme

*Construction:* Let $m$, $n$ and $k$ be 3 positive integers with $n = k + m$. Let $S_1 \in \mathbb{Z}_q^{m \times k}$ be a matrix with small (and sparse) coefficients. For simplicity, we assume $S_1$ is sampled from a certain $\beta$-bounded sampler such that $\|S_1\|_\infty \leq \beta \ll q$. In practice one can use either a discrete Gaussian sampler with small variance, or a uniform sampler within a small range.

Our secret key is a matrix $S := [pS_1 | I_m] \in \mathbb{Z}_q^{m \times n}$ with small entries. The public key is constructed from a matrix $A = \begin{bmatrix} A_1 \\ A_2 \end{bmatrix}$ such that $SA = 0 \bmod q$ and $A_2$ is invertible mod $q$. Equivalently, we can sample $A_1$ uniformly from $\mathbb{Z}_q^{k \times m}$, and then set $A_2 = -pS_1A_1 \bmod q$. We re-sample $A_1$ if $A_2$ is not invertible mod $q$. The SIS lattice defined by $A$ is:

$$\mathcal{L} := \{(u, v) : uA_1 + vA_2 = 0 \bmod q\},$$

where $S$ is a short trapdoor basis for this lattice. Note that the procedure above is a standard construction for the SIS problem, except that we have a factor of $p$ on $S_1$. We will show the equivalence between our construction and the standard SIS problem in the next subsection.

It is perhaps more convenient to look at a $k \times m$ matrix $B := A_1(-A_2)^{-1} \mod q$. With $B$, the lattice $\mathcal{L}$ can be interpreted as $$\mathcal{L} := \{(u, v) : uB = v \mod q\},$$

with a Learning with Error (LWE) basis $P = \begin{bmatrix} 0 & qI_m \\ I_k & B \end{bmatrix}$ that allows for efficient sampling.

*Signing:* We model the hash function $H$ as a random oracle that outputs uniformly over $\mathbb{Z}_p^n$. This allows us to generate random elements $m_p \in \mathbb{Z}_p^n$ from a message digest $\mu$. We write $m_p := (u_p, v_p)$, with $u_p \in \mathbb{Z}_p^k$ and $v_p \in \mathbb{Z}_p^m$.

The next step is to sample a vector $(u_1, v_1)$ from $P$ such $u_1 \equiv u_p \mod p$. To do so, one can simply sample a vector $r$ from a discrete Gaussian distribution $\chi_\sigma^k$. Then, compute $u_0 = pr$, $u_1 = u_0 + u_p$, and then find a lattice vector whose "$s$-side" is $u_1$ by setting $v_1 = u_1 B \mod q$. As such, $(u_1, v_1)$ is a vector in the lattice, with $u_1 \equiv u_p \mod p$.

An alternative way to view the above procedure is to generate a random vector $(r, rB \mod q)$ in the lattice. By definition, the matrix $[I_k|B]$ is a basis of a sub-lattice of $\mathcal{L}(P)$. Also, since $r$ is sampled from a discrete Gaussian distribution, this random vector can be viewed as an output of a GPV sampler [23] over $\mathcal{L}([I_k|B])$. If $\sigma$ is greater than the smoothing parameter of $\mathcal{L}([I_k|B])$, the vector $r([I_k|B])$ will be uniform over $\mathcal{L}([I_k|B])$ and a discrete Gaussian over $\mathbb{Z}^n$. Then we take this vector modulo $q$ to obtain the exact output vector.

Since $v_1$ is discrete Gaussian over $\mathbb{Z}^n$, it will have random coefficients modulo $p$, and therefore will not meet the congruence condition. To complete the process, we need to micro-adjust $v_1$ so that the $t$-side also meets the congruence condition; in the meantime we do not want to break the congruence condition on the $s$-side. We use the secret basis $S = [pS_1|I_m]$ to achieve this goal. Let $a = v_p - v_1 \mod p$. We compute $(u_2, v_2) = aS = (paS_1, a)$. Note that $(u_2, v_2) \equiv (0, a) \mod p$ by construction, and $(u_2, v_2)$ is a vector in the lattice.

The final signature is $(u, v) = (u_1, v_1) + (u_2, v_2)$. It is easy to see that $(u, v)$ remains in the lattice as long as $\|v\|_\infty < q/2$. On the other hand, we have $$u = u_1 + u_2 = u_1 \equiv u_p \mod p$$

and $$v = v_1 + v_2 \equiv v_1 + v_p - v_1 \equiv v_p \mod p.$$

Therefore, $(u, v)$ is a valid signature for our scheme.

2.2 Rejection sampling

As stated before, a candidate signature $(\mathbf{u}, \mathbf{v})$ leaks information about the secret key $\mathbf{S}$. To seal this leak one need to use the rejection sampling technique. The efficiency of the above scheme relies heavily on how often one will need to reject a signature. As a proof of concept, we will show how rejection sampling can be used to seal information leakage here. We will give a more efficient instantiation in Section 3, which uses bimodal Gaussian distribution.

*Rejection sampling on* $\mathbf{u}$. Recall that $\mathbf{u} = p(\mathbf{r} + \mathbf{aS}_1) + \mathbf{u}_p$. Since both $p$ and $\mathbf{u}_p$ are publicly known, we need to seal the leakage of $\mathbf{S}_1$ from $\mathbf{b} := \mathbf{r} + \mathbf{aS}_1$. Also recall that $\chi_\sigma^k$ is the distribution for $\mathbf{r}$. This situation is exactly analogous to the one handled by rejection sampling in [34].

*Rejection sampling on* $\mathbf{v}$. On the $t$-side, we do not require rejection sampling. We have $\mathbf{v} = \mathbf{v}_1 + \mathbf{v}_2$. First, $\mathbf{v}_1 = (p\mathbf{r} + \mathbf{u}_p)\mathbf{B}$, which is not linked to the secret key $\mathbf{S}_1$. Second, $\mathbf{v}_2 = (\mathbf{v}_1 - \mathbf{v}_p) \bmod p$ is also not linked to any secret key.

Another way of saying this is that rejection sampling is not required for the $t$-side due to the fact that the "secret key" corresponding to the $t$-side is actually $\mathbf{I}_m$. In fact, we can write $\mathbf{v} = \mathbf{v}_1 + \mathbf{aS}_2$ where $\mathbf{S}_2$ happens to be $\mathbf{I}_m$. As we shall see in the next section, we still need to use rejection sampling to seal the leakage for $\mathbf{S}_2$ when an alternative secret matrix replaces $\mathbf{I}_m$.

Nonetheless we do need to restart if $\|\mathbf{v}\|_\infty$ becomes too large and causes a wrap-around mod $q$. When this occurs, the congruent condition is broken after mod $q$ reduction.

*Alternatives.* In our construction we choose to do rejection sampling so that $\|\mathbf{v}\|_\infty$ does not cause any wrap-around. We chose this approach despite the following two alternatives. First, the signer can send a helper indicating to the verifier the coefficients where wraparound occurred. This can be seen as a reconciliation approach of Ding's (R)LWE-based key exchange in 2012 [15], whose variants are used in [42,39,7]. We do not adopt this solution as it would increase the signature size.

Second, since the wrap-around only occurs with a low probability, we can let the verifier accept the signature based on a fuzzy matching: accept the signature when the majority of the coefficients on the $t$-side meet the congruent condition. This promising method may weaken our security since it makes forgery easier. For conservative purpose we do not consider this approach.

2.3 Signature compression

There are three sources of compression. First, one can effectively store only the "$s$-side" of the vector instead of the whole vector, so long as the vector is in $\mathcal{L}$. In other words, given $\mathbf{u}$, the verifier is able to reconstruct $\mathbf{v} = \mathbf{uB} \bmod q$.

Second, the verifier is able to reconstruct $\mathbf{u} = p\mathbf{b} + \mathbf{u}_p$ from $\mathbf{b}$ as both $p$ and $\mathbf{u}_p$ are publicly known. So only $\mathbf{b}$ is required for verification.

Finally, since b follows a discrete Gaussian distribution after the rejection sampling, one can use code based compression techniques to reduce the space requirement for b.

The final signature is a $k$-dimensional discrete Gaussian vector that allows for Hoffman coding. The size of the final signature is $k(\log(\sigma) + 2)$.

---

Algorithm 1 Signing Algorithm

Input: Message $\mu$; Public key B; Secret key $S_1$; Distribution $\chi_\sigma$
Input: Parameters $k$, $m$, $p$, $q$, $M$
Output: A signature b for message $\mu$
1: $(u_p, v_p) = \text{Hash}(\mu|B)$
2: $r \leftarrow \chi_\sigma^k$;
3: $u_1 = pr + u_p$; $v_1 = u_1 B \mod q$
4: $a = v_p - v_1 \mod p$
5: $v = v_1 + a$;
6: if $\|v\|_\infty > q/2$ then go to step 2 end if
7: return $b = (r + aS_1)$ with probability $1 / \left( M \exp\left( \frac{-2\langle b, aS_1 \rangle + \|aS_1\|^2}{2\sigma^2} \right) \right)$
8: go to step 2

---

Algorithm 2 Verification Algorithm

Input: Message $\mu$; Public key B; Signature b; Parameters $p$, $q$
Output: Accept or Reject the signature
1: $(u_p, v_p) = \text{Hash}(\mu|B)$
2: $u = pb + u_p$
3: If $\|u\|_\infty \geq q/2$ then Reject end if
4: $v = uB \mod q$
5: if $v \neq v_p \mod p$ then Reject end if
6: return Accept

2.4 Transcript simulation

By Theorem 4.6 of [34], the signature algorithm specified above must be statistically indistinguishable from a triple $(u_p, v_p, b)$, with distribution $U_p^k \times U_p^m \times \chi_\sigma^k$, where $U_p$ is uniform mod $p$ and $\chi_\sigma^k$ is our discrete Gaussian distribution. Such a transcript, indistinguishable from a genuine transcript, can be simulated without knowledge of the secret key in the following way:

1. Choose b at random from $\chi_\sigma^k$;
2. Set $u = pb + u_p$, with $u_p$ chosen at random mod $p$ so that $\|u\|_\infty < q/2$;
3. Set $v \equiv uB \mod q$, and lift v to the interval $(-q/2, q/2]$;
4. If $\|v\|_\infty > \lfloor \frac{q}{2p} \rfloor p$ goto step 1; otherwise, output $v_p \equiv v \mod p$.

It is easy to see that $u_p$ and b follow the desired distribution. Now we will show $v_p$ also follows $U_p^m$.

First, B is indistinguishable from a random matrix by construction. Therefore, one can view B as a random mapping from $\mathbb{Z}_q^k$ to $\mathbb{Z}_q^m$. Then, since u has enough entropy (as b is sampled from $\chi_\sigma^k$), v will be indistinguishable from random elements over $\mathbb{Z}_q^m$. Finally we use rejection sampling to ensure v mod $p$ is uniform modulo $p$. With appropriate parameters, for example, $p|q$ or $q \equiv 1 \mod p$, etc., this procedure will terminate within polynomial time.

2.5 Security

For the security of the public key, it is easy to see that the ability to find the secret key (or merely a short enough vector that allows for forging) from a public key can be reduced to the ability to solve an SIS problem. In this section we are mainly focused on the difficulty of forging signatures.

To quantify the difficulty of forgery, let us first introduce the learning with truncation problem.

Definition 1 ($LWT_{q,p,n,m}$). *Let $q, p, n, m$ be positive integers with $p$ co-prime to $q$. Sample uniformly at random a matrix $A \in \mathbb{Z}_q^{n \times m}$ and a vector $s \in \mathbb{Z}_q^n$; compute $b = sA \mod q \mod p$; the decisional LWT problem is: given two pairs $(A, b)$ and $(A, [u]_p)$ where u is sampled uniformly at random in $\mathbb{Z}_q^n$, distinguish those two pairs. The computational problem is: given $(A, b)$, find s.*

As mentioned earlier, this LWT problem can be viewed as an inverse of the LWR problem. Here we show the reduction between the problems.

Lemma 1. *Choose a pair $(p, q)$ such that both $p$ and $r \equiv p^{-1} \mod q$ are on the order of $\sqrt{q}$. Then, if there exists an algorithm $\mathcal{A}$ that solves the computational LWT with parameters $q, p, n, m$ for any input $(A, b) \in \mathbb{Z}_q^{n \times m} \times \mathbb{Z}_p^m$, there exists another algorithm $\mathcal{B}$ that solves the computational LWR with parameters $q, r, n, m$, with $(A', b')$ for $A'$ sampled uniformly at random from $\mathbb{Z}_q^{n \times m}$.*

We sketch the proof here.

*Proof.* Suppose algorithm $\mathcal{A}$ is able to solve the LWT problem, that is, given $(\mathbf{A}, \mathbf{b})$ it finds a lattice vector $\mathbf{v}$ such that

- $\mathbf{v} = \mathbf{b} \bmod p$, and
- $\mathbf{v} = \mathbf{tA} \bmod q$ for some $\mathbf{t}$.

Then, we can build an oracle that, upon input $(\mathbf{A}, \mathbf{b})$, it finds vectors $\mathbf{u}$ and $\mathbf{t}$, such that
$$\mathbf{v} + p\mathbf{u} = \mathbf{tA} \bmod q,$$
for some $\|\mathbf{u}\|_\infty \leq \lfloor \frac{q}{2p} \rfloor < r$.

Given an input of an LWR instance $(\mathbf{A}', \mathbf{b}')$, algorithm $\mathcal{B}$ sets $\mathbf{A} = p\mathbf{A}'$, $\mathbf{b} = \mathbf{b}'$ and $r = p^{-1} \bmod q$; then $\mathcal{B}$ invokes $\mathcal{A}$ with input $(\mathbf{A}, \mathbf{b})$. Since $\mathbf{A}'$ is drawn from uniform, and $p$ is co-prime with $q$, $\mathbf{A}$ is also uniform over $\mathbb{Z}_q^{n \times m}$. Also, since $\|\mathbf{b}\|_\infty \leq p$ by design, $(\mathbf{A}, \mathbf{b})$ will be a legitimate input to $\mathcal{A}$. Therefore, $\mathcal{A}$ will find $\mathbf{u}$ and $\mathbf{t}$ such that $\mathbf{b} + p\mathbf{u} = \mathbf{tA} \bmod q$, which is $$r\mathbf{b}' + \mathbf{u} = \mathbf{tA}' \bmod q \quad \text{and} \quad \mathbf{b}' = \lfloor \mathbf{tA}' \bmod q \rfloor_r$$

Therefore, $\mathbf{t}$ is the solution to the computational LWR problem. ∎

Now we are ready to quantify the hardness of the forgery.

Theorem 1 (Unforgeability). *Let* $\mathbf{B}$ *be a public key generated as per our scheme with parameters* $q, p, n, m$. *For any new input message* $\mu$, *if an adversary* $\mathcal{A}$ *is able to forge a signature with a non-negligible probability* $\rho$, *then there is an algorithm* $\mathcal{B}$ *that solves* $LWT_{q,p,k,m}$ *with the same probability.*

*Proof.* First, we have modeled the hash function $H$ as a random oracle that outputs uniformly over $\mathbb{Z}_p^n$. In addition, the forger is asked to sign on a message that he has not seen before. Hence, if algorithm $\mathcal{B}$ is able to forge a signature for every legitimate input $\mu$ with non-negligible probability, it must be that $\mathcal{A}$ is able to forge a signature for any legitimate $\mathbf{m}_p = H(\mu|\mathbf{B})$. In the meantime, any *new* "mod $p$" vector will look like a legitimate hash output from the forger's point of view.

Next, we claim that $\mathbf{B}$ is indistinguishable from a matrix randomly and uniformly chosen from $\mathbb{Z}_q^{k \times m}$. This follows from the fact that $\mathbf{A}$ is indistinguishable from a matrix randomly and uniformly chosen from $\mathbb{Z}_q^{n \times m}$. Recall
$$\mathbf{B} = \mathbf{A}_1(-\mathbf{A}_2)^{-1} \bmod q \text{ and } \mathbf{A} = \begin{bmatrix} \mathbf{A}_1 \\ \mathbf{A}_2 \end{bmatrix}.$$

Therefore, given an LWT instance $(\mathbf{A}', \mathbf{b}')$, the forger cannot distinguish $\mathbf{A}'$ from a legitimately generated public key; it also cannot distinguish $\mathbf{b}'$ from a legitimately generated public message digest. As a result, it will return a signature vector $\mathbf{v}$ which will pass the verification test with probability $\rho$. From $\mathbf{v}$ it is easy to extract the solution to the LWT problem. ∎

We remark that to have such a tight reduction from the forgery to LWR/LWT we will have required a rather large $p$, on the order of $\sqrt{q}$, which makes this scheme less efficient. As we will see in next section, our efficient instantiation uses practical parameters that are derived from best-known attacks (this is also the design principle for most practical lattice-based signatures, except for [6]). For this purpose we will choose a small $p$ that allows for efficient rejection sampling.

*Strong unforgeability.* One subtlety in the (standard) unforgeablity notion is that the forger is asked to sign messages that have never been previously signed. The notion of strong unforgeability, however, requires an attacker to be unable to forge a signature on a message, even if a set of signatures of this same message are given. This is not captured by the above theorem. Indeed, here we show a modification that allows strong unforgeability to be achieved.

As shown in [27], for a given message digest $m_p$, all candidate signatures associated with this message digest are *short* vectors within the intersection of the original lattice and $p\mathbb{Z}^n + m_p$. Therefore, the task of forgery becomes finding a short vector in the original lattice that meets the length requirement and the congruence mod $p$ requirement. This is roughly the reduction to the approx-CVP in [27].

Now, suppose that the attacker is given a list of signatures on a same message digest, then, it becomes easier (compared to without this list) for the attacker to find another short vector in this lattice, that is, generating a new signature on this same message. However, we note that any linear combination of such signatures is highly unlikely to also satisfy the correct mod $p$ congruence conditions.

In general, our solution to achieving strong unforgeability is to include a random salt in the hash when generating the message digest; this salt will be part of the signature and used during verification. This ensures that it is highly improbable, (probability $(1/p)^{2n}$ for each message), that the same message digest will occur more than once. Note that this is also the same technique that provides similar functionalities for GPV based signatures [23].

Nevertheless, as the strong unforgeability model is sometimes too strong for practical use (i.e., the attacker doesn't need to forge a new signature since it has already got a list of them on a same message), we leave out this salt in our efficient instantiation to minimize signature size.

3 A practical instantiation with an NTRU lattice

In the previous section we presented an inefficient modular lattice signature scheme based on the SIS/LWT which requires $n \approx m \log(m)$. Even if we use the ring-SIS version the scheme is still somewhat inefficient as it requires $n \approx \log(m)$ - the reduction of a factor of $m$ comes directly from the use of the ring. A natural way to improve its efficiency is to relax the requirement of $n \approx \log(m)$ (This will make the underlying (ring) SIS problem easier, so we will derive parameters from the best known attacks).

For example we can reduce $n$ to $2m$ (2 in the case of ring-SIS). This makes $A_1$ a square matrix which causes another issue:

$$pS_1A_1 + I_mA_2 = 0 \bmod q.$$

When $A_1$ is a square matrix and invertible, one can easily recover $S_1$ from $A_1$ and $A_2$.

A naive remedy is to set $A_2$ to be private too, and therefore we will have a secret matrix $[pS_1|A_2]$ and a public matrix $\begin{bmatrix} A_1 \\ I_m \end{bmatrix}$ which also satisfies the above equation without giving away $S_1$. This seemingly plausible solution poses another challenge: we are not able to perform a micro-adjustment on the "$t$-side" of the vector anymore, as now $A_2$ is no longer small. If we perform the same micro-adjustment as before, the coefficients of $u_2$ will explode and will always cause wrap-around over $q$.

Hence, the final solution to the above problem is to have a small and private $A_2$. The final key generation becomes finding such $A_2$ and an invertible $S_1$, and setting $A_1 = A_2(pS_1)^{-1} \bmod q$. This, not surprisingly, yields an NTRU lattice. In the following, we will slightly change the notation: $H := A_1$, $G := A_2$ and $F := S_1$.

3.1 Overview

In the following we will work over the polynomial ring $\mathcal{R}_q = \mathbb{Z}_q[x]/(x^N + 1)$. Our scheme also works over other rings, such as $\mathbb{Z}_q[x]/(x^N - 1)$ with minor modification. Let $f(x)$, $g(x)$ and $h(x)$ be 3 polynomials in $\mathcal{R}_q$, where $f(x)$ and $g(x)$ have very small coefficients; $h(x) = p^{-1}g(x)f^{-1}(x)$. We express by f, g and h the vector form of the polynomials. Also let F, G and H be the matrix obtained from nega-cyclic rotations. The NTRU lattice with regard to $h$ is defined as $$\mathcal{L}_h = \{(u,v) \in \mathcal{R}_q^2 : uh = v\}$$

or rather, the vector/matrix form:

$$\mathcal{L}_h = \{(u,v) : uH = v \bmod q\}$$

where there exists a public basis $P = \begin{bmatrix} 0 & qI_N \\ I_N & H \end{bmatrix}$ and a secret generator $[pF|G]$. We also require $g(x)$ to be invertible over $\mathcal{R}_p$, which is the same as G being invertible mod $p$.

The rest of the scheme is almost identical to the one presented in the previous section, except for a few differences.

First, we use rejection samplings on keys. This gives us better bounds for $\|af\|_\infty$ and $\|ag\|$ during signing, and in return ensures a better rejection rate. Note that key rejection isn't uncommon. For example, it was also performed in BLISS [16], with a different rejection method.

Second, we use a bimodal Gaussian distribution to improve the acceptance rate. To cope with this modification, we set $p = 2$ so that the change of signs in $b = r \pm af$ will vanish after reduction modulo $p$ Third, we use $[pF|G]$ rather than $[pS_1|I_m]$ to perform the micro-adjustment. This modification does raise another issue: the "$t$-side" vector during the signing procedure will contain information about G. To be precise, the "$t$-side" vector will be $v := v_1 \pm ag$ where $v_1$ is indistinguishable from uniform over $\mathcal{R}_q$, a is uniform over $\mathbb{Z}_p^N$. We will need to perform rejection sampling to seal the leakage of information about g. As shown in [27], after rejection sampling, the distribution of v will be computationally indistinguishable from uniform over $(-\frac{q}{2} + B_t, \frac{q}{2} - B_t)$ for a public parameter $B_t$ which depends on $q$, the (uniform) distribution of a, and the number of +1s and −1s in g.

To avoid confusion, we will use $M_s$ to denote the rejection rate for the $s$-side, $M_t$ for the $t$-side, and $M$ for the overall rate.

3.2 The scheme

*Key generation* : The key generation algorithm is shown in Algorithm 3. We use

---

Algorithm 3 Key Generation Algorithm

---

Input: Parameters $N, p, q, d, B_k$.
Output: Public key h and secret key $(pf, g)$.
1: $f \leftarrow T(d+1, d)$;
2: if f is not invertible mod $q$ then go to step 1 end if;
3: $F \leftarrow$ Cyclic matrix of f, and $\bar{f} \leftarrow$ sum of rows of F;
4: if $\|\bar{f}\|_\infty > B_k$ then go to step 1 end if;
5: $g \leftarrow T(d+1, d)$;
6: if g is not invertible mod $p$ then go to step 5 end if
7: $G \leftarrow$ Cyclic matrix of g, and $\bar{g} \leftarrow$ sum of rows of G;
8: if $\|\bar{G}\|_\infty > B_k$ then go to step 5 end if;
9: $h = g/(pf) \mod q$
10: return h, g and f

--- the classical NTRU flat form (non-product form, cf. [28]) keys with a pre-fixed number of +1s and −1s. Here, $T(d_1, d_2)$ is a set of trinary polynomials of degree less than $N$, where there are exactly $d_1$ positive coefficients and $d_2$ negative coefficients. One can choose thicker keys for a higher level of security. Since we require both f and g to be invertible, we have set $f(1) = g(1) = 1$.

Now we give arguments for rejection sampling on f. A similar argument applies to g. We wish to estimate $\|af\|_\infty$ where a is assumed a uniform binary vector. We view af as a vector-matrix multiplication: aF. Since a is binary, this operation can be seen as randomly adding some coefficients from each row of F. Therefore for a given f, the corresponding $\|\bar{f}\|_\infty$ will correlate with the expected value of $\|af\|_\infty$. Hence, rejection sampling based on $\|\bar{f}\|_\infty$ will ensure that $\|af\|_\infty$ is also likely to be small. Note that with the parameters given in this paper, our key space after the rejection sampling is still large enough to be robust against search attacks.

*Signing algorithm* : We highlight the differences between this signing algorithm and the one described in previous section.

Algorithm 4 Signing Algorithm
---
Input: Message $\mu$; Public key h; Secret key f and g; Distribution $\chi_\sigma$
Input: Parameters $N$, $p$, $q$, $M_s$, $B_s$, $B_t$
Output: A signature b for message $\mu$
1: $(\mathbf{u}_p, \mathbf{v}_p) = \text{Hash}(\mu|\mathbf{h})$
2: $\mathbf{r} \leftarrow \chi_\sigma^N$, $b \leftarrow \{0, 1\}$
3: $\mathbf{u}_1 = p\mathbf{r} + \mathbf{u}_p$; $\mathbf{v}_1 = \mathbf{u}_1 \mathbf{h} \bmod q$
4: $\mathbf{a} = (\mathbf{v}_p - \mathbf{v}_1)/\mathbf{g} \bmod p$
5: $\mathbf{v} = \mathbf{v}_1 + (-1)^b \mathbf{a}\mathbf{g}$;
6: if $\|\mathbf{v}\|_\infty > q/2 - B_t$ then go to step 2 end if
7: return $\mathbf{b} = (\mathbf{r} + (-1)^b \mathbf{a}\mathbf{f})$ with probability $1/\left(M_s \exp\left(-\frac{\|\mathbf{af}\|}{2\sigma^2}\right) \cosh\left(\frac{\langle \mathbf{b}, \mathbf{af}\rangle}{\sigma^2}\right)\right)$
8: go to step 2
---

First, there is a factor of $\mathbf{g}^{-1} \bmod p$ for step 4, which is there to ensure the congruence condition for the $t$-side.

Second, in step 5, we check the norm requirements for af and ag. This is to ensure that the rejection samplings in the followed steps deliver the desired acceptance rate. Note that $B_s$ is a public parameter depending only on $d_1, d_2$. It is determined experimentally by an average over a large number of samples of f chosen randomly from $T(d_1, d_2)$ and a chosen randomly and uniformly from $\mathbb{Z}_p^N$.

Third, in step 7, rejection sampling is performed on the $t$-side, parameterized by an additional integer $B_t$. The distribution of the $t$-side vector will be uniform within the interval $(-\frac{q}{2} + B_t, \frac{q}{2} - B_t)$. The public parameter $B_t$ is also computed as an average over a large number of choices of g and a, as described in Section 6.1.

Finally, unlike the scheme in previous section, here we have $$(\mathbf{u}, \mathbf{v}) = (\mathbf{u}_1, \mathbf{v}_1) + (-1)^b(\mathbf{u}_2, \mathbf{v}_2)$$

for a random bit $b$. This makes the raw distribution of $\mathbf{b} := (\mathbf{r} + (-1)^b \mathbf{a}\mathbf{f})$ a bimodal Gaussian distribution. As stated before, one can achieve a much higher acceptance rate for this distribution. Note that in the initial construction of BLISS [16], the bimodal Gaussian distribution makes a signature sometimes unverifiable due to the odd modulus $q$. BLISS solved this problem by moving the modulus from $q$ to $2q$. We solve this problem by setting $p = 2$. It follows that $\mathbf{v} \equiv \mathbf{v}_1 + (-1)^b(\mathbf{v}_p - \mathbf{v}_1) \equiv \mathbf{v}_p \bmod 2$.

3.3 Transcript simulation

As in Section 2.4, a transcript, indistinguishable from a genuine transcript, can be simulated without knowledge of the secret key in the following way. Note that the only difference here is $p|(q/2 - B_t)$ in our setting.

1. Choose b at random from $\chi_\sigma^N$;
2. Set $\mathbf{u} = p\mathbf{b} + \mathbf{u}_p$, with entries of $\mathbf{u}_p$ chosen at random $\bmod p$;

---
Algorithm 5 Verification Algorithm
---
Input: Message $\mu$; Public key h; Signature b; Parameters $p$, $q$, $B_t$, $\sigma$, $N$
Output: Accept or Reject the signature
1: $(u_p, v_p) = \text{Hash}(\mu|h)$
2: $u = pb + u_p$
3: if $\|u\|^2 > p^2\sigma^2 N$ then Reject end if
4: $v = uh \bmod q$
5: if $v \not\equiv v_p \bmod p$ or $\|v\|_\infty > q/2 - B_t$ then Reject end if
6: return Accept
---

3. Set $v \equiv uh \bmod q$, and lift $v$ to the interval $(-q/2, q/2]$;
4. Reject if $\|v\|_\infty > q/2 - B_t$ and return to Step 1. Otherwise set $v_p \equiv v \bmod p$ and accept b as a signature on $u_p, v_p$.

3.4 Security

A similar reduction to the approximate shortest vector problem can be applied here, except that we need to adjust the approximation parameter for the $\gamma$-SVP because $\lambda_1 = \|(f, g)\|$ in the NTRU lattice is smaller than the Gaussian heuristic length. We omit the details.

4 Batch verification

The modular lattice signature scheme presented here allows for same key batch verification. This is because, as stated in the introduction, the sum of signatures, after lifting to the integers, is still a valid lattice vector that satisfies the mod $p$ congruence condition.

However, in order to fully utilize this functionality, it appears at first that one will need to send the whole lattice vector as the signature. In other words, one cannot merely send the "$s$-side" of the vector. To see why this is the case, suppose that for two signatures $(u, v)$ and $(u', v')$ corresponding to messages $(u_p, v_p)$ and $(u'_p, v'_p)$, one computes $$(v + v') \bmod q = (u + u')h \bmod q$$

The difficulty is that $(v + v')$ will, with high probability, cause a wraparound mod $q$, as $\|v + v'\|_\infty \lessapprox q - 2B_t$. Thus one will recover $(v + v') \bmod q$ rather than $v + v'$. When this occurs, $$(v + v') \bmod q \bmod p \neq (v_p + v'_p) \bmod p$$

and the verification will fail.

One way to solve this issue is to send both the "$s$-side" and the "$t$-side" of the vector. Then one recovers $u + u'$ and $v + v'$ over the integers. The mod $p$ relationship can be checked from this, and then the lattice relation mod $q$ can be checked. As a trade-off, one will have to send 2 elements in $\mathcal{R}_q$ for each signature. This increases the size of a signature.

We can actually do efficient batch verification with a much smaller cost. We can send merely the "$t$-side" of the vectors. Then the sum of the $t$-side vectors can be computed over the integers, and the congruence mod $p$ can be checked. Then, multiplying by $h^{-1}$ and reducing mod $q$ will reveal the sum of the "$s$-side" of the vectors mod $q$. Signature aggregation works so long as the sum of the "$s$-side" vectors mod $q$ identically equals the sum over the integers, that is, does not result in any wrap-around modulo $q$. Since the "$s$-side" vectors are Gaussian distributed with a variance $\sigma$ much smaller than $q$, we are able to sum quite a few $s$-side vectors without a wrap-around mod $q$.

To be precise, suppose we want to verify $k$ signatures in one batch. Since a sum of $k$ samples from $\chi_\sigma$ is also a Gaussian with variance $\sqrt{k}\sigma$, we know that the maximum absolute value of the coefficients, i.e, $\|\sum_k \mathbf{u}_i\|_\infty$, will be bounded above by $\sqrt{k}\tau\sigma$ (recall that $\tau$ is the Gaussian tail-cutting parameter). Therefore, having $\sqrt{k}\tau\sigma \leq q/2$ will eliminate wrap-around. That is, we are able to batch verify $$k = \lfloor \left(\frac{q}{2\tau\sigma}\right)^2 \rfloor$$

signatures in one batch. For our parameter choices, to be shown in the Appendix, we have $k = 97$, $q = 2^{16} + 1$, $\sigma = 250$ and $\tau = 13.3$. See Algorithm 6, below, for the batch verification algorithm.

---

Algorithm 6 Batch Verification Algorithm

---

Input: Messages $\{\mu_i\}$; Public key B; Signature $\{\mathbf{v}_i\}$;Parameters $p$, $q$, $B$, $k$, $\sigma$
Output: Accept or Reject the signature
1: $(\mathbf{u}_{p,i}, \mathbf{v}_{p,i}) = \text{Hash}(\mu_i | B)$
2: if $\|\mathbf{v}_i\|_\infty > q/2 - B_t$ then Reject end if
3: $(\mathbf{u}_p, \mathbf{v}_p) = 0;\ \mathbf{v} = 0$
4: for $i \in [k]$ do
5: $\quad (\mathbf{u}_p, \mathbf{v}_p)\ += (\mathbf{u}_{p,i}, \mathbf{v}_{p,i})$
6: $\quad \mathbf{v}\ += \mathbf{v}_i$
7: end for
8: $\mathbf{u} = \mathbf{v}h^{-1} \bmod q$
9: if $\|\mathbf{u}\|_\infty > \sqrt{k}\tau p\sigma$ then Reject end if
10: if $(\mathbf{u}, \mathbf{v}) \neq (\mathbf{u}_p, \mathbf{v}_p) \bmod p$ then Reject end if
11: return Accept

---

4.1 Attack and proof for batch verification

Here is an potential attack on batch setting, which performs better than forging a single signature directly. For a set of message digests $\{\mathbf{u}_p^{(i)}, \mathbf{v}_p^{(i)}\}$ for $1 \leq i \leq k$, do the following:

- for each $v_p^{(i)}$, find a random vector $v_1^{(i)}$ such that $v_1^{(i)} = v_p^{(i)} \mod p$;
- set $V = \sum_i^k v_1^{(i)}$; $V$ meets the congruent condition by design;
- compute $U = Vh^{-1}$;
- Since we allows $(U, V)$ to be reasonably large, we can simply use the public key/basis $(I, pH^{-1})$ for the micro-adjustments. Suppose the micro adjustment vector is $(U_0, V_0)$
- Write $V_0$ as a sum of $k$ vectors $\{v_0^{(i)}\}$
- Publish $v_i = v_0^{(i)} + v_1^{(i)}$ as the signatures.

In short, The attacker finds a large vector $(U, V)$ in the lattice, congruent to the sum of messages mod $p$. In addition, $V$ can be written as a sum of $k$ different $v^{(i)}$'s such that $v^{(i)}$ is congruent to $v_p^{(i)}$ for each message mod $p$. In the meantime, the $U$ vector also meet the congruence condition; while the attacker doesn't need to find individual $u^{(i)}$'s. In the meantime, for sufficiently large $k$, the size of $(U, V)$ will be acceptable. Hence, the attack can claim that each such small vector is a signature for a given message, as collectively they can be batch verified, although each individual verification will fail.

Note that for this attack to work, $k$ needs to be large. For properly chosen $k$ this attack will fail. The intuition is that, when $k$ is small enough, the sum of $k$ valid signatures will remain a short vector in the lattice so that the root Hermite factor with respect to this lattice/vector is still small (although it will be larger than in a single verification setting). In other words, if the attacker is able to find a vector $(U, V)$ sufficiently small, he is also able to find an approximate shortest vector in the lattice (with a root Hermite factor slightly larger than the single verification case).

References

1. NSA Suite B Cryptography - NSA/CSS.
2. NTRU OpenSource Project. online. available from https://github.com/NTRUOpenSourceProject/ntru-crypto.
3. What is the world's data storage capacity?, 2011. available from http://www.zdnet.com/article/what-is-the-worlds-data-storage-capacity/.
4. The number of atoms in the World, 2014. available from http://www.fnal.gov/pub/science/inquiring/questions/atoms.html.
5. Martin R. Albrecht, Shi Bai, and Léo Ducas. A subfield lattice attack on overstretched NTRU assumptions - cryptanalysis of some FHE and graded encoding schemes. In *CRYPTO 2016*, pages 153–178, 2016.
6. Erdem Alkim, Nina Bindel, Johannes A. Buchmann, and Özgür Dagdelen. TESLA: tightly-secure efficient signatures from standard lattices. *IACR Cryptology ePrint Archive*, 2015:755, 2015.
7. Erdem Alkim, Léo Ducas, Thomas Pöppelmann, and Peter Schwabe. Post-quantum key exchange - A new hope. In *25th USENIX Security Symposium, USENIX Security 16, Austin, TX, USA, August 10-12, 2016.*, pages 327–343, 2016.
8. Joël Alwen, Stephan Krenn, Krzysztof Pietrzak, and Daniel Wichs. Learning with rounding, revisited - new reduction, properties and applications. In *CRYPTO 2013*, pages 57–74, 2013.

9. Shi Bai, Thijs Laarhoven, and Damien Stehlé. Tuple lattice sieving. *IACR Cryptology ePrint Archive*, 2016:713, 2016.
10. Abhishek Banerjee, Chris Peikert, and Alon Rosen. Pseudorandom functions and lattices. In *EUROCRYPT 2012*, pages 719–737, 2012.
11. Daniel J. Bernstein. A subfield-logarithm attack against ideal lattices, 2014. available from https://blog.cr.yp.to/20140213-ideal.html.
12. Lily Chen, Stephen Jordan, Yi-Kai Liu, Dustin Moody, Rene Peralta, Ray Perlner, and Daniel Smith-Tone. Report on post-quantum cryptography. National Institute of Standards and Technology Internal Report 8105, February 2016.
13. Yuanmi Chen and Phong Q Nguyen. BKZ 2.0: Better lattice security estimates. In *ASIACRYPT 2011*, pages 1–20. Springer, 2011.
14. Don Coppersmith and Adi Shamir. Lattice attacks on NTRU. In *EUROCRYPT*, pages 52–61, 1997.
15. Jintai Ding. A simple provably secure key exchange scheme based on the learning with errors problem. *IACR Cryptology ePrint Archive*, 2012:688, 2012.
16. Léo Ducas, Alain Durmus, Tancrède Lepoint, and Vadim Lyubashevsky. Lattice signatures and bimodal gaussians. In *CRYPTO 2013*, pages 40–56, 2013.
17. Léo Ducas, Tancrède Lepoint, Vadim Lyubashevsky, Peter Schwabe, Gregor Seiler, and Damien Stehlé. CRYSTALS - dilithium: Digital signatures from module lattices. *IACR Cryptology ePrint Archive*, 2017:633, 2017.
18. Léo Ducas, Vadim Lyubashevsky, and Thomas Prest. Efficient identity-based encryption over NTRU lattices. In *ASIACRYPT 2014*, pages 22–41, 2014.
19. Léo Ducas and Phong Q. Nguyen. Learning a zonotope and more: Cryptanalysis of ntrusign countermeasures. In *ASIACRYPT 2012*, pages 433–450, 2012.
20. Pierre-Alain Fouque, Jeffrey Hoffstein, Paul Kirchner, Vadim Lyubashevsky, Thomas Pornin, Thomas Prest, Thomas Ricosset, Gregor Seiler, William Whyte, and Zhenfei Zhang. Falcon: Fast-Fourier Lattice-based Compact Signatures over NTRU.
21. Nicolas Gama and Phong Q. Nguyen. Predicting lattice reduction. In *EUROCRYPT'08*.
22. Nicolas Gama, Phong Q. Nguyen, and Oded Regev. Lattice enumeration using extreme pruning. In *EUROCRYPT 2010*, volume 6110 of *LNCS*, pages 257–278. Springer, 2010.
23. Craig Gentry, Chris Peikert, and Vinod Vaikuntanathan. Trapdoors for hard lattices and new cryptographic constructions. In *Proceedings of the 40th annual ACM symposium on Theory of computing*, STOC '08, page 197206, New York, NY, USA, 2008. ACM.
24. Oded Goldreich, Shafi Goldwasser, and Shai Halevi. Public-key cryptosystems from lattice reduction problems. In *CRYPTO '97*, pages 112–131, 1997.
25. Lov K. Grover. A fast quantum mechanical algorithm for database search. In *Proceedings of the Twenty-eighth Annual ACM Symposium on Theory of Computing*, STOC '96, pages 212–219, New York, NY, USA, 1996. ACM.
26. Jeffrey Hoffstein, Nick Howgrave-Graham, Jill Pipher, Joseph H. Silverman, and William Whyte. NTRUSIGN: digital signatures using the NTRU lattice. In *Topics in Cryptology - CT-RSA 2003, The Cryptographers' Track at the RSA Conference 2003, San Francisco, CA, USA, April 13-17, 2003, Proceedings*, pages 122–140, 2003.
27. Jeffrey Hoffstein, Jill Pipher, John M. Schanck, Joseph H. Silverman, and William Whyte. Transcript secure signatures based on modular lattices. In *PQCrypto 2014*, pages 142–159, 2014.

28. Jeffrey Hoffstein, Jill Pipher, John M. Schanck, Joseph H. Silverman, William Whyte, and Zhenfei Zhang. Choosing parameters for ntruencrypt. In *CT-RSA 2017*, pages 3–18, 2017.
29. Jeffrey Hoffstein, Jill Pipher, and Joseph H. Silverman. NTRU: A ring-based public key cryptosystem. In *Algorithmic Number Theory, Third International Symposium, ANTS-III, Portland, Oregon, USA, June 21-25, 1998, Proceedings*, pages 267–288, 1998.
30. Jeffrey Hoffstein, Jill Pipher, William Whyte, and Zhenfei Zhang. A signature scheme from learning with truncation. Cryptology ePrint Archive, Report 2017/995, 2017. http://eprint.iacr.org/2017/995.
31. Jeffrey Hoffstein and Joseph H. Silverman. Meet-in-the-middle Attack on an NTRU private key, 2006. available from http://www.ntru.com.
32. Nick Howgrave-Graham. *CRYPTO 2007*, chapter A Hybrid Lattice-Reduction and Meet-in-the-Middle Attack Against NTRU, pages 150–169. Springer Berlin Heidelberg, Berlin, Heidelberg, 2007.
33. Vadim Lyubashevsky. Fiat-shamir with aborts: Applications to lattice and factoring-based signatures. In *ASIACRYPT 2009*, page 598616. Springer, 2009.
34. Vadim Lyubashevsky. Lattice signatures without trapdoors. In David Pointcheval and Thomas Johansson, editors, *EUROCRYPT 2012*, volume 7237 of *LNCS*, pages 738–755. Springer, 2012.
35. Vadim Lyubashevsky and Daniele Micciancio. On bounded distance decoding, unique shortest vectors, and the minimum distance problem. In *CRYPTO 2009*, pages 577–594, 2009.
36. Daniele Micciancio and Chris Peikert. Hardness of SIS and LWE with small parameters. In *CRYPTO 2013*, pages 21–39, 2013.
37. Daniele Micciancio and Oded Regev. Worst-case to average-case reductions based on gaussian measures. *SIAM J. Comput.*, 37(1):267–302, 2007.
38. Phong Q. Nguyen and Oded Regev. Learning a parallelepiped: Cryptanalysis of GGH and NTRU signatures. *J. Cryptology*, 22(2):139–160, 2009.
39. Chris Peikert. Lattice cryptography for the internet. In *PQCrypto 2014*, pages 197–219, 2014.
40. Oded Regev. On lattices, learning with errors, random linear codes, and cryptography. In *Proceedings of the 37th Annual ACM Symposium on Theory of Computing, Baltimore, MD, USA, May 22-24, 2005*, pages 84–93, 2005.
41. Peter W. Shor. Algorithms for quantum computation: Discrete logarithms and factoring. In *FOCS*, pages 124–134, 1994.
42. Jiang Zhang, Zhenfeng Zhang, Jintai Ding, and Michael Snook. Authenticated key exchange from ideal lattices. *IACR Cryptology ePrint Archive*, 2014:589, 2014.

A  Background

A.1  Notations

We use lower case bold letters for vectors, upper case bold letters for matrices. For a polynomial $f(x) = f_0 + f_1 x + \cdots + f_{n-1}x^{n-1}$, we denote its vector form by $\mathbf{f} := \langle f_0, f_1, \ldots, f_{n-1} \rangle$. We sometimes abuse the notation of vector and polynomial when there is no ambiguity. For a polynomial/vector $\mathbf{f}$, the norms are $$\|\mathbf{f}\| := \sqrt{\sum_{i=0}^{n-1} f_i^2} \text{ and } \|\mathbf{f}\|_\infty := \max(|f_i|).$$

We often use the polynomial rings $\mathcal{R}_q := \mathbb{Z}[x]/F(x)$ with $F(x) = x^n + 1$. An anti-cyclic rotated matrix of a polynomial $f(x)$ over the ring $\mathcal{R}_q$ is a matrix $\mathbf{M} = (\mathbf{f}_1, \mathbf{f}_2, \ldots, \mathbf{f}_n)^T$ with $\mathbf{f}_i = f(x)x^{i-1} \mod F(x)$.

For a real $a$, we let $\lfloor a \rceil$ denote the closet integer to $a$. For an integer $a$, we use $[a]_q$ to denote $a \mod q$; $\lfloor a \rceil_p := (a - [a]_p)/p$ for the operation of rounding $a$ to the closest multiple of $p$. Modular operations are center lifted, for example $a \mod q$ returns an integer within $-q/2$ and $q/2$. These notations are also extended to vectors and matrices.

A.2 NTRU, SIS, LWR and lattices

A lattice $\mathcal{L}$ is a discrete sub-group of $\mathbb{R}^n$, or equivalently, the set of all the integral combinations of $d \leq n$ linearly independent vectors over $\mathbb{R}$:

$$\mathcal{L} := \mathbb{Z}\mathbf{b}_1 + \mathbb{Z}\mathbf{b}_2 + \cdots + \mathbb{Z}\mathbf{b}_d, \mathbf{b}_i \in \mathbb{R}^n.$$

$\mathbf{B} := (\mathbf{b}_1, \ldots, \mathbf{b}_d)^T$ is called a basis of $\mathcal{L}$. Given a lattice $\mathcal{L}$, finding a vector that is no longer than $\gamma \cdot \lambda_1(\mathcal{L})$ is called the approximate shortest vector problem ($\gamma$-SVP), where $\lambda_1$ is the first minima, i.e, the length of the shortest vector, of the lattice. The Gaussian heuristic says that for random lattices, this first minima should be approximately $\lambda_1 \approx \sqrt{\frac{\dim}{2\pi e}} \det(\mathcal{L})^{\frac{1}{\dim}}$, where $\det(\mathcal{L})$ denotes the determinant of $\mathcal{L}$. Given a particular lattice $\mathcal{L}$, where there exists a unique shortest non-zero vector, finding this vector is called the unique shortest vector problem.

We view an NTRU lattice as an $\mathcal{R}_q$ module of rank 2. Let $\mathbf{f}, \mathbf{g} \in \mathcal{R}_q$ with small coefficients. Let $\mathbf{h} = \mathbf{g}/\mathbf{f}$ over $\mathcal{R}_q$. The NTRU lattice associated with $\mathbf{h}$ is defined as $$\mathcal{L} := \{(\mathbf{s}, \mathbf{t}) \in \mathcal{R}_q^2 : \mathbf{t} \equiv \mathbf{sh} \mod q\}.$$

Given $\mathbf{h}$, it is believed to be hard to find $\mathbf{f}$ and $\mathbf{g}$. This is known as the *NTRU assumption*, and it can be reduced to the unique shortest vector problem for the NTRU lattice.

We write a vector in the NTRU lattice as $\mathbf{v} = \langle \mathbf{s}, \mathbf{t} \rangle$, where $\mathbf{s}$ and $\mathbf{t}$ are each an element in $\mathcal{R}_q$. In addition, we refer to the sub-vector that forms the first part of this vector as the "$s$-side" vector, and that which forms the second part of this vector as the "$t$-side" vector.

We extend this notion to the short integer solution problem (SIS) when applicable. Recall that an SIS problem is defined as follows:

Definition 2 ($\text{SIS}_{q,n,m,\beta}$ problem). *Given a random matrix $\mathbf{A} \in \mathbb{Z}_q^{n \times m}$, find a short non-zero vector $\mathbf{v}$ such that $\mathbf{vA} \equiv 0 \mod q$ with $\|\mathbf{v}\|_2 \leq \beta$.*

For a matrix $\mathbf{A}$ that is a horizontal concatenation of two matrices, i.e., $\mathbf{A} = \begin{bmatrix} \mathbf{A}_1 \\ \mathbf{A}_2 \end{bmatrix}$, the lattice associated with $\mathbf{A}$ is defined as $$\mathcal{L} := \{(\mathbf{s}, \mathbf{t}) : \mathbf{sA}_1 + \mathbf{tA}_2 \equiv 0 \mod q\}.$$

Finding a short $(s, t)$ in this lattice provides a solution to the SIS problem. It was shown in [36] that solving SIS on average for $n = \text{poly}(m)$, $q \geq \beta \cdot m^\delta$ for some positive $\delta$, is as hard as the shortest independent vector problem with approximating factor $\max\{1, \beta\beta_\infty/q\} \cdot O(\beta\sqrt{m})$ where $\beta_\infty$ is the upper bound for the infinity norm of $v$.

The SIS problem has a "dual" version, known as the LWE problem. Informally speaking, let $m, n, q$ be some positive integers, let $\chi_\sigma$ be an error distribution parameterized by $\sigma$, for example, a discrete Gaussian distribution with standard deviation $\sigma$, sample uniformly at random $A \in \mathbb{Z}_q^{n \times m}$, $s, b_1 \in \mathbb{Z}_q^n$; sample $e \in \chi_\sigma^m$; compute $b_0 = sA + e \mod q$; the decisional LWE assumption states that given two pairs $(A, b_0)$, with $b_0$ generated as above; and $(A, b_1)$, with $b_1$ chosen from a uniform distribution, one is not able to distinguish those two pairs.

We also make use of the learning with rounding (LWR) problem [10,8]. This can be seen as a variant of the learning with errors (LWE) problem [40], with deterministic errors from rounding. We formally record the LWR problem as follows:

Definition 3 (LWR$_{q,r,n,m}$ problem). *Sample uniformly at random a matrix $A \in \mathbb{Z}_q^{n \times m}$ and a vector $s \in \mathbb{Z}_q^n$; compute $b = \lfloor sA \mod q \rfloor_r$; the decisional LWR problem is: given two pairs $(A, b)$ and $(A, \lfloor u \rfloor_r)$ where $u$ is sampled uniformly at random in $\mathbb{Z}_q^n$, distinguish those two pairs. The computational problem is: given $(A, b)$, find $s$.*

It has been shown in [8] that the decisional LWR$_{q,r,n,m}$ problem is hard assuming the hardness of LWE$_{q,r,n,m'}$ with parameters $$m \geq \frac{\log(q)}{\log(2\gamma)} \cdot m' \quad \text{and} \quad q \geq \gamma(nm\beta p)$$

for some $\gamma \geq 1$. To the best of our knowledge, we are not aware of reductions between computational LWR and other assumptions.

A.3 Bimodal Gaussian distribution and rejection sampling

An $n$-dimensional Gaussian distribution with mean $v$ and standard deviation $\sigma$ is defined by $\rho_{v,\sigma}(x) := \exp(\frac{-\|x-v\|^2}{2\sigma^2})$. When there is no ambiguity, we abbreviate this by $\rho_\sigma$. An $n$-dimensional discrete Gaussian distribution over $\mathbb{Z}$ is defined by $\chi_\sigma := \frac{\rho_\sigma(x)}{\rho_\sigma(\mathbb{Z}^n)}$, where $\rho_\sigma(\mathbb{Z}^n) := \sum_{z \in \mathbb{Z}^n} \rho_\sigma(z)$ is a scaling quantity needed to make the function into a probability distribution [34].

*Tail cutting:* For a discrete Gaussian distribution $\chi_\sigma^m$ and a positive $\tau > 1$, $$\rho_\sigma(\mathbb{Z}^m \setminus \tau\sigma\sqrt{m}\mathcal{B}) \leq 2\rho_\sigma(\mathbb{Z}^m) \left(\tau \exp\left(\frac{1-\tau^2}{2}\right)\right)^m,$$

where $\mathcal{B}$ is the centered unit ball [37]. As suggested in [16], setting $\tau = \sqrt{\lambda 2 \ln 2}$ for a 1-dimensional Gaussian will ensure all samples are bounded by $\tau\sigma$ with a probability greater than $1 - 2^{-\lambda}$. Typically, $\tau = 13.3$ for $\lambda = 128$ and $\tau = 18.8$ for $\lambda = 256$.

*Rejection sampling:* Let S be a secret matrix, c be a vector sampled from a uniform distribution, and y be a vector sampled from $\chi_\sigma$. Consider the distribution of $x = y + cS$, i.e., a Gaussian distribution shifted by cS. It has been shown in [38,19] that each sample x leaks partial information on S. The method used to seal this leakage is rejection sampling [33]: making the output distribution independent of S by probabilistically accepting the output according to certain criteria.

As shown in [34], if we wish to force output distribution to be the same as y, it is sufficient to have $$\frac{\chi_\sigma(x)}{\chi_{cS,\sigma}(x)} \leq M,$$

and this inequality holds with $$M = \exp\left(\frac{2\tau\sigma \max_c \|cS\| + \max_c \|cS\|^2}{2\sigma^2}\right)$$

where $M$ is the repetition rate. The constant $M$ determines the rate of rejection, and the smaller $M$ is, the more efficient the signature generation process is. A common choice is to set $\sigma = \tau \max_c \|cS\|$ which gives a constant (while still largish) $M$. This is improved when bimodal Gaussian sampling is used [16].

*Bimodal Gaussian:* Informally speaking, a bimodal Gaussian is a sum of two Gaussian distributions with the same $\sigma$ and means of the same absolute value, with opposite signs. Following the above example, the distribution of $x = y \pm cS$ is very close to a bimodal Gaussian distribution. One can use rejection sampling to produce the Gaussian distribution $\chi_\sigma$ from the bimodal Gaussian distribution $\frac{1}{2}\chi_{cS,\sigma}(x) + \frac{1}{2}\chi_{-cS,\sigma}(x)$ if there exists a constant $M$ such that $$\frac{\chi_\sigma(x)}{\frac{1}{2}\chi_{cS,\sigma}(x) + \frac{1}{2}\chi_{-cS,\sigma}(x)} \leq M.$$

It has been shown in [16] that this inequality holds with $$M = \exp\left(\frac{\max_c(\|cS\|^2)}{2\sigma^2}\right). \tag{1}$$

It is also shown in [16], that for an individual $x = y \pm cS$, the probability of accepting it is given by $$\rho = 1/\left(M \exp\left(-\frac{\|cS\|}{2\sigma^2}\right) \cosh\left(\frac{\langle x, cS\rangle}{\sigma^2}\right)\right). \tag{2}$$

*Remark 2.* As usual there is a trade-off between efficiency and storage size. For the discrete Gaussian distribution $\chi_\sigma$, the entropy of its output x is bounded above by $$\mathcal{H}(x) \lessapprox k\log(4.1\sigma).$$

Therefore, such a vector can be efficiently stored with approximately $k(\log(\sigma)+2)$ bits, using Hoffman coding. Thus a smaller $\sigma$ yields a smaller signature, but simultaneously makes rejection sampling less efficient.

B  Parameters and benchmarks

We give 2 sets of parameters. The first one, namely, Gaussian-1024, is designed in accordance with the scheme described in Section 4. For completeness, we also provide parameters for the original pqNTRUSign scheme. Its parameter set is named Uniform-1024. The pqNTRUSign signature scheme, with both parameters, have been submitted to NIST for standardization consideration for post-quantum cryptography.

We estimate that Gaussian-1024 and Uniform-1024 provide 269 bits of classical security and 149 bits of quantum security. The details of the above estimations shall be presented in Appendix C. Note that the parameter sets in this proposal are not the same as in [27,30] due to the use of a different estimation model. In previous estimations [27,30], the authors followed the work of [13] and [16] by assuming that a root Hermite factor of 1.005 is not achievable. Here we have used a more rigorous estimation for our new parameter sets.

Table 1. Parameters.

| PARAM | $\mathcal{R}, N, q$ | $d_f, d_g$ | $\sigma$ | $B_k, B_s, B_t$ | Raw PK size | Raw Sig size |
|---|---|---|---|---|---|---|
| Gaussian-1024 | $\frac{\mathbb{Z}_q[x]}{x^N+1}, 1024, 2^{16}+1$ | 205 | 250 | 40, 500, 49 | 16384 bits | $\approx$ 11264 bits |
| Uniform-1024 | $\frac{\mathbb{Z}_q[x]}{x^N+1}, 1024, 2^{10}+1$ | 205 | N/A | 40, 98, 49 | 16384 bits | 16384 bits |

We implemented our scheme with C. Our software is available at [2] under GPL license. We benchmarked our implementation on a dual core Intel i7-6600U processor @ 2.60GHz. Our operation system was Linux Ubuntu 16.04. We used gcc version 5.4.0.

Table 2. Benchmark results

|  | Gaussian-1024 | Uniform-1024 |
|---|---|---|
| Key Generation | 47.8 ms | 48.9 ms |
| Signing | 120 ms | 72 ms |
| Verification | 0.96 ms | 0.97 ms |

We present the implementation results in Table 2. We also note that we did not use FTT/NTT techniques to accelerate ring multiplications in signing/verification since we need to perform mod $p$ over the integers regularly. We leave the investigation of this potential optimization to future work.

C  Best known attacks

C.1  Overview

In this evaluation, we will 1. follow the original BKZ 2.0 analysis [13] with the extreme pruning method to estimate the classical security;
2. follow the new analysis in [7] using BKZ 2.0 with quantum sieving to estimate the quantum security.

For completeness, we also give the analysis result of 3. the new analysis in [7] using BKZ 2.0 with classical sieving.

However, we will *not* use this result to estimate the classical security, due to the excessive space requirement. We give more details and justifications in the next subsection.

Table 3. Lattice strength given by root Hermite factor

|  | Gaussian-1024 | Uniform-1024 |
|---|---|---|
| Public key strength $\left(\frac{GH}{\lambda_1}\right)^{\frac{1}{2N}}$ | $524^{\frac{1}{2048}} \approx 1.0030$ | |
| Forgery strength $\left(\frac{\|u,v\|}{GH}\right)^{\frac{1}{2N}}$ | $25^{\frac{1}{2048}} \approx 1.0016$ | $153^{\frac{1}{2048}} \approx 1.0024$ |

For signatures, there are two types of attacks, namely, public key attacks which try to recover the secret key from a public key, and forgery attacks, which try to forge a signature without a secret key. As we shall see from Table 3, forgery attacks are strictly harder than public key attacks, due to the smaller root Hermite factors. Therefore, our focus here is to evaluate the security of the public keys, i.e., recovering f or g from h.

Here, we summarize the evaluations in Table 4.

Table 4. Best known attacks and their costs on public keys

| N | BKZ + Enum | | BKZ + Sieving | | BKZ + QSieving | |
|---|---|---|---|---|---|---|
|  | uSVP | Hybrid | uSVP | Hybrid | uSVP | Hybrid |
| 1024 | 407 | 269 | 165 | 165 | 149 | 154 |

C.2 Lattice attacks on public keys

For an NTRU public key polynomial h, let H be the matrix whose row vectors are the cyclic rotation of h. Then the NTRU lattice associated with h uses a basis of the rows of $$B = \begin{bmatrix} qI_N & 0 \\ H & I_N \end{bmatrix}$$

where $I_N$ is an $N$-dimensional identity matrix. Within this NTRU lattice, there exist unique shortest vectors, namely, the vector form of $\langle f, g \rangle$ and its cyclic rotations.

This attack was first presented in the original NTRU paper [29] circulated during the rump session of Crypto'96. It was later observed in [14] that one does not necessarily need to find the exact secret key to be able to decrypt. An attack is successful if the attacker can locate any vectors in this lattice that are sufficiently small (such as a cyclic rotation of the secret key).

It has been shown in [21] that the ability to locate a unique shortest vector in a lattice depends on the root Hermite factor of the lattice, which is the $n$-th root of $$\frac{\text{Gaussian expected length}}{l_2 \text{ norm of the target vector}}$$

where $n$ is the dimension of the lattice.

Here, we give an estimate for the root Hermite factor corresponding to the proposed parameter set. This lattice has a dimension of $2N$. The Gaussian expected length of the shortest vector in this lattice is $$\sqrt{qN/\pi e},$$

while the $l_2$ norm of the target vectors are $\|\mathbf{f}, \mathbf{g}\|_2$. This gives the root Hermite factor of the lattice as $$\left(\frac{\sqrt{Nq/\pi e}}{\|\mathbf{f}, \mathbf{g}\|_2}\right)^{\frac{1}{2N}}.$$

It was originally believed that the current technique of BKZ 2.0 [13] is only able to find a short vector with a root Hermite factor of at least 1.005. However, in [7], the authors give a conservative analysis of the cost of BKZ 2.0 reduction. As pointed out by the authors themselves, those estimations are very optimistic about the abilities of an attacker. In particular, unlike the analysis of BKZ 2.0 [13], where the cost of shortest vector subroutines is estimated via the cost of enumeration with extremely pruning [22], this analysis assumes that for large dimensional lattices, shortest vector problems can be solved very efficiently using heuristic sieving algorithms, ignoring the sub-exponential to exponential requirement of space.

Giving a few details, the best known classical and quantum sieving algorithms have time costs of $2^{0.292n}$ and $2^{0.265n}$, respectively [9]. The best plausible quantum short vector problem solver costs more than $2^{0.2075n}$ since this is the space required to store the list of vectors. In practice, sieving tends to process much slower than enumeration techniques. Moreover, sieving algorithms require a similar level of space complexity (exponential in $n$), while the space requirement of enumeration techniques is polynomial.

For the sake of completeness, we present the estimated cost of BKZ with classical and quantum sieving algorithms, following the methodology of [7]. It is easy to see that the space requirement for classical sieving algorithms is far from practical. For example, it is estimated that the world's storage capacity is around 295 exabytes $\approx 2^{68}$ bits [3]; and the number of atoms in the whole earth is around $10^{49} \approx 2^{162}$ [4]. Thus we do not use BKZ with classical sieving to estimate the classical security of our parameters. Nonetheless, we do use BKZ with quantum sieving algorithms to estimate the quantum security, in accounting for unknown effects on data storages with quantum computers.

C.3 Search attack

For NTRU with trinary keys, since the secret keys are trinary polynomials with $df$ number of 1s and $-1$s, the search space for the secret key is $\binom{N}{df+1,df}/N$. For example, with our parameter set, we have $2^{1384}$ candidates. (The factor $1/N$ comes from the fact that an attacker can guess any of $N$ anti-cyclic rotations of the secret key, rather than just the secret key itself.) We remark that this key space for our parameter set is considerably larger than that in [28] due to the switch from product form polynomials to flat form polynomials. This is sufficient even with the presence of meet-in-the-middle attacks [31] and quantum attacks using Grover's algorithm [25].

C.4 Hybrid attack

The previous best known attack against NTRU, prior to the BKZ with quantum sieving analysis [7], was the hybrid attack [32] which is a hybrid of a lattice attack and a meet-in-the-middle search attack. We present the cost of the classical hybrid attack and compare it with solving directly the uSVP in Table 4.

C.5 Subfield attack

Subfield attacks against NTRU have been considered in [11]. It was reported in [5] that for certain "over-stretched" NTRU parameters, one can exploit a subfield. This attack was only applicable to the NTRU lattices that are used to instantiate a (fully) homomorphic encryption scheme. The authors of [5] also showed that for our parameters the subfield attack will not be successful.

C.6 Forgeries.

The best forgery attack, other than deriving the secret keys from the public keys via the above attacks, is the lattice reduction attack shown in [27]. Forging a signature can be accomplished if an associated approximate closest vector problem in the intersection of the NTRU lattice, and $p\mathbb{Z}^{2N}$ can be solved. Therefore, the task of forgery can be solved by finding a vector that meets the congruence mod $p$ requirements, and is sufficiently close to the intersection lattice to satisfy the length requirement.

This problem is harder than that of finding a short vector in the intersection lattice, and so to simplify our analysis we will use this to quantify the strength of the lattice problem. The intersection lattice is generated by the rows of the matrix $$\begin{bmatrix} 0 & pq\mathbf{I}_N \\ p\mathbf{I}_N & p\mathbf{H}' \end{bmatrix},$$

for some appropriate H'. We also assume that this lattice behaves like a random lattice.

For Uniform-1024, each coordinate of u (and v) is approximately randomly and uniformly distributed between $-q/2+B_s$ and $q/2-B_s$ ($-q/2+B_t$ and $q/2-B_t$, resp.). Ignoring the $B_s$, the average squared coefficient will be approximately $$\frac{1}{q}\int_{-q/2}^{q/2} x^2 dx = q^2/12.$$

Thus u and v will have norm $\|u\|^2 \approx \|v\|^2 \approx q^2 N/12$. We thus have $$\frac{\text{Target Length}}{\text{Gaussian Heuristic Length}} = \frac{\sqrt{q^2 N/6}}{\sqrt{Np^2 q/\pi e}} = \sqrt{\frac{q\pi e}{6p^2}}.$$

For Gaussian-1024, notice that the lattice is not "balanced" as $\|u\|$ is significantly smaller than $\|v\|$. In general, if the target is a vector $(u, v)$, with $u, v$ each $N$-dimensional, and satisfying $\|u\| \approx a\sqrt{N}$ and $\|v\| \approx b\sqrt{N}$, then the optimal matrix for maximizing strength against lattice reduction attacks, that is, minimizing the ratio of the norm of the target of the Gaussian expected norm, is the $2N$ by $2N$ matrix $$\begin{bmatrix} 0 & pqI_N \\ \alpha p I_N & pH \end{bmatrix},$$

with $\alpha$ chosen so that $\alpha = b/a$.

The vector $(\alpha u, v)$ will be a short vector in this matrix, and it is not surprising that the optimal $\alpha$ equalizes the lengths of the vectors $\alpha u$, and $v$. We omit the details justifying this.

We now determine the values of $a, b$ in our case. As it is a sum of $k$ vectors, with each coordinate choses from the Gaussian distribution, the expected norm of $\|u\|$ will satisfy $\|u\|^2 \approx p^2\sigma^2 kN$. Thus $a = p\sigma\sqrt{k}$. Also, $$v = \sum_{i=1}^{k} v_i,$$

with the coordinates of each $v_i$ approximately randomly and uniformly distributed between $-q/2 + B_t$ and $q/2 - B_t$. As uniformly distributed vectors in high dimensions are close to orthogonal, It follows that $$\|v\|^2 \approx \sum_{i=1}^{k} \|v_i\|^2.$$

Each coordinate of $v_i$ will be approximately randomly and uniformly distributed between $-q/2+B_t$ and $q/2-B_t$. Ignoring the $B_t$, the average squared coefficient will be approximately $$\frac{1}{q}\int_{-q/2}^{q/2} x^2 dx = q^2/12.$$

Thus v will have norm $\|v\|^2 \approx kq^2N/12$, so $b = q\sqrt{k/12}$.

As stated above, in our particular case $a = p\sigma\sqrt{k}$, $b = q\sqrt{k/12}$, so $\alpha = q/(p\sigma\sqrt{12})$, and the length of the target is $$\text{Length target} \approx b\sqrt{2N} = q\sqrt{kN/6}.$$

For general, $a, b$, and $\alpha = b/a$, the determinant of the matrix is $\alpha^N p^{2N} q^N$, and thus the length of the Gaussian expected shortest vector is $$\text{Gaussian Heuristic Length} = \alpha^{1/2} p q^{1/2} \sqrt{\frac{2N}{2\pi e}} = \sqrt{\frac{Npq^2}{\pi e \sigma \sqrt{12}}}$$

We thus have $$\frac{\text{Target Length}}{\text{Gaussian Heuristic Length}} = \sqrt{\frac{\pi e \sigma k}{p\sqrt{3}}},$$

and the strength against forgery is determined by the $2N^{th}$ root of this ration, which equals.

$$\left(\frac{\pi e \sigma k}{p\sqrt{3}}\right)^{1/(4N)}.$$

The invention claimed is:

1. A method for signing and subsequently verifying a plurality of digital messages, comprising the following steps implemented using at least one processor-based subsystem:

selecting parameters including an integer q, a relatively smaller integer p that is coprime with q, and a Gaussian function parameter;

generating random polynomial f relating to p and random polynomial g relating to q;

producing a public key that includes h, where h is equal to a product that can be derived using g and the inverse of f mod q;

producing a private key from which f and g can be derived;

storing the private key and publishing the public key;

producing a plurality of message digests by hashing each of the plurality of digital messages with the public key;

for each message digest, producing a digital signature using the message digest, the private key, and a Gaussian noise polynomial related to said Gaussian function parameter; and performing a batch verification procedure utilizing the plurality of digital signatures and the public key to determine whether the digital signatures are valid, wherein said step of performing a batch verification procedure includes implementing a verification on a modulo p summation of a component of all of said digital signatures.

2. The method as defined by claim 1, wherein said step of producing a digital signature further includes implementing an iterative rejection sampling procedure comprising employing successive randomly generated Gaussian noise polynomials, in conjunction with a message digest and the private key, to obtain candidate digital signatures until a particular candidate digital signature is obtained that meets predetermined criteria, and selecting said particular candidate digital signature.

3. The method as defined by claim 1, wherein said step of producing a digital signature further includes implementing an iterative rejection sampling procedure comprising employing successive randomly generated Gaussian noise polynomials, in conjunction with a message digest and the private key, to obtain candidate digital signatures until a particular candidate digital signature is obtained that meets predetermined criteria, and selecting said particular candidate digital signature.

4. The method as defined by claim 1, further comprising transmitting the digital signatures, and wherein said step of performing a batch verification procedure includes receiving the transmitted digital signatures and performing the batch verification procedure on the received digital signatures.

5. The method as defined by claim 2, further comprising transmitting the digital signatures, and wherein said step of performing a batch verification procedure includes receiving the transmitted digital signatures and performing the batch verification procedure on the received digital signatures.

6. The method as defined by claim 1, wherein said plurality of digital messages comprises a multiplicity of digital messages.

7. The method as defined by claim 1, wherein said plurality of digital messages comprises a multiplicity of digital messages.

8. A method for signing and subsequently verifying a digital message, comprising the following steps implemented using at least one processor-based subsystem:

selecting parameters including an integer q, a relatively smaller integer p that is coprime with q, and a Gaussian function parameter;

generating random polynomial f relating to p and random polynomial g relating to q;

producing a public key that includes h, where h is equal to a product that can be derived using g and the inverse of f mod q;

producing a private key from which f and g can be derived;

storing the private key and publishing the public key;

producing a message digest by hashing the digital message with the public key;

producing a digital signature using the message digest, the private key, and Gaussian noise polynomials related to said Gaussian function parameter, including implementing an iterative rejection sampling procedure comprising employing successive randomly generated Gaussian noise polynomials, in conjunction with the message digest and the private key, to obtain candidate digital signatures until a particular candidate digital signature is obtained that meets predetermined criteria, and selecting said particular candidate digital signature; and performing a batch verification procedure utilizing the digital signature, among a plurality of digital signatures, and the public key to determine whether the digital signature is valid, wherein said step of performing a batch verification procedure includes implementing a verification on a modulo p summation of a component of all of said digital signatures.

9. The method as defined by claim 8, further comprising transmitting the digital signature, and wherein said step of performing a batch verification procedure includes receiving the transmitted digital signature and performing the batch verification procedure on the plurality of digital signatures including the received digital signature.

10. A method for signing a plurality of digital messages for subsequent verification, comprising the following steps implemented using at least one processor-based subsystem:

selecting parameters including an integer q, a relatively smaller integer p that is coprime with q, and a Gaussian function parameter;

generating random polynomial f relating to p and random polynomial g relating to q;

producing a public key that includes h, where h is equal to a product that can be derived using g and the inverse of f mod q;

producing a private key from which f and g can be derived;

storing the private key and publishing the public key;

producing a plurality of message digests by hashing each of the plurality of digital messages with the public key;

for each message digest, producing a digital signature using the message digest, the private key, and Gaussian noise polynomials related to said Gaussian function parameter, including implementing an iterative rejection sampling procedure comprising employing successive randomly generated Gaussian noise polynomials, in conjunction with the message digest and the private key, to obtain candidate digital signatures until a particular candidate digital signature is obtained that meets predetermined criteria, and selecting said particular candidate digital signature; and performing a batch verification procedure utilizing the plurality of digital signatures and the public key to determine whether the digital signatures are valid, wherein said step of performing a batch verification procedure includes implementing a verification on a modulo p summation of a component of all of said digital signatures.

11. The method as defined by claim 10, further comprising transmitting the digital signatures and receiving the transmitted digital signatures, and wherein the batch verification procedure is performed on the received digital signatures and the public key.

12. The method as defined by claim 10, where said plurality of digital messages comprises a multiplicity of digital messages.

13. The method as defined by claim 11, where said plurality of digital messages comprises a multiplicity of digital messages.

* * * * *